(12) United States Patent
Williams et al.

(10) Patent No.: US 7,290,478 B2
(45) Date of Patent: Nov. 6, 2007

(54) STOP FOR A SLIDE ASSEMBLY

(75) Inventors: Matthew R. Williams, Fort Wayne, IN (US); Cale M. Reese, Fort Wayne, IN (US); Clyde W. Sprowl, Huntington, IN (US)

(73) Assignee: PHD, Inc., Fort Wayne, IN (US)

( * ) Notice: Subject to any disclaimer, the term of this patent is extended or adjusted under 35 U.S.C. 154(b) by 18 days.

(21) Appl. No.: 11/340,121

(22) Filed: Jan. 26, 2006

(65) Prior Publication Data
US 2006/0180017 A1    Aug. 17, 2006

Related U.S. Application Data

(60) Provisional application No. 60/648,010, filed on Jan. 28, 2005.

(51) Int. Cl.
F15B 15/24   (2006.01)
F15B 15/00   (2006.01)

(52) U.S. Cl. ............................. 92/88; 92/15
(58) Field of Classification Search ............... 92/15, 92/18, 27, 28, 88
See application file for complete search history.

(56) References Cited

U.S. PATENT DOCUMENTS

| | | | |
|---|---|---|---|
| 4,785,716 A | | 11/1988 | Vaughn et al. |
| 4,856,415 A | | 8/1989 | Noda |
| 4,926,982 A | | 5/1990 | Granbom |
| 5,335,583 A | * | 8/1994 | Kaneko et al. ............... 92/88 |
| 5,469,940 A | | 11/1995 | Yamamoto et al. |
| 5,568,982 A | * | 10/1996 | Stoll et al. ...................... 92/88 |
| 5,606,903 A | * | 3/1997 | Drittel ............................ 92/88 |
| 5,653,314 A | | 8/1997 | Yamamoto et al. |
| 5,941,350 A | | 8/1999 | Yamamoto et al. |
| 5,950,790 A | * | 9/1999 | Barber ........................... 92/88 |
| 6,196,110 B1 | * | 3/2001 | Angue ........................... 92/88 |
| 6,257,123 B1 | | 7/2001 | Morr et al. |
| 6,874,407 B2 | * | 4/2005 | Doleschel et al. ............. 92/88 |

FOREIGN PATENT DOCUMENTS

| | | |
|---|---|---|
| DE | 103099 | 4/1926 |
| DE | 104527 | 10/1926 |
| DE | G 92 08 584.9 | 6/1992 |

(Continued)

OTHER PUBLICATIONS

TOL-O-MATIC, Inc. Parts Sheet (2005 TOL-O-MATIC, Inc.).

*Primary Examiner*—Thomas E. Lazo
(74) *Attorney, Agent, or Firm*—Barnes & Thornburg LLP

(57) ABSTRACT

A rodless slide assembly is provided illustratively having a longitudinally-extending cylinder, a carriage, a stop assembly, and a catch assembly. The longitudinally-extending cylinder comprises first and second ends and a path of travel extending therebetween. The carriage is slidable on the path of travel on the cylinder between the first and second ends. The stop assembly comprises a stop block and is coupled to the carriage. In one embodiment the catch assembly includes a catch bar and an actuator assembly. The catch bar is located adjacent the path of travel of the carriage. The actuator assembly selectively moves the catch bar to engage the stop block and stop the carriage when the carriage is positioned at a selected location on the path of travel.

22 Claims, 19 Drawing Sheets

FOREIGN PATENT DOCUMENTS

| | | |
|---|---|---|
| DE | G 93 18 065.9 | 11/1993 |
| DE | G 94 09 497.7 | 3/1994 |
| DE | 44 20 573 A1 | 6/1994 |
| DE | 44 26 701 A1 | 7/1994 |
| DE | G 94 12 170.2 | 7/1994 |
| DE | 295 09 582 U1 | 6/1995 |
| DE | 296 21 358 U1 | 12/1996 |
| DE | 199 09 729 A1 | 3/1999 |
| EP | 0 436 461 B1 | 1/1990 |
| JP | 11117910 A * | 4/1999 |
| JP | 11351256 A * | 12/1999 |

* cited by examiner

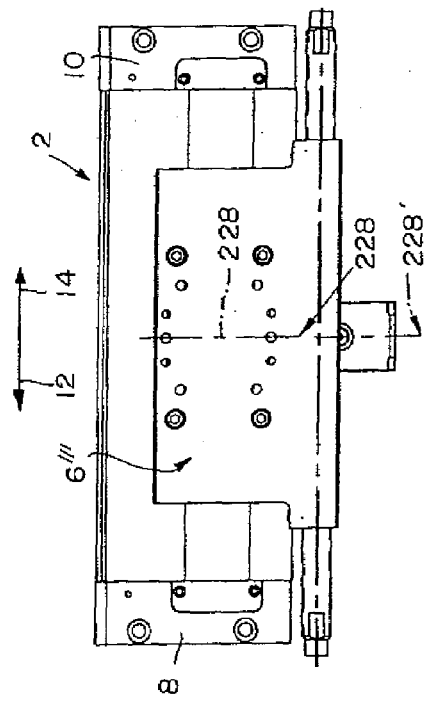
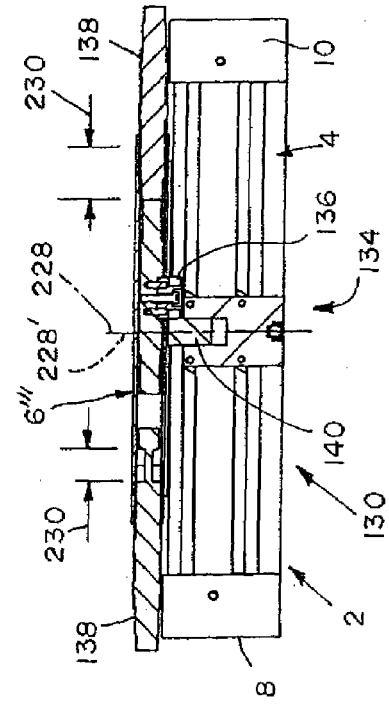
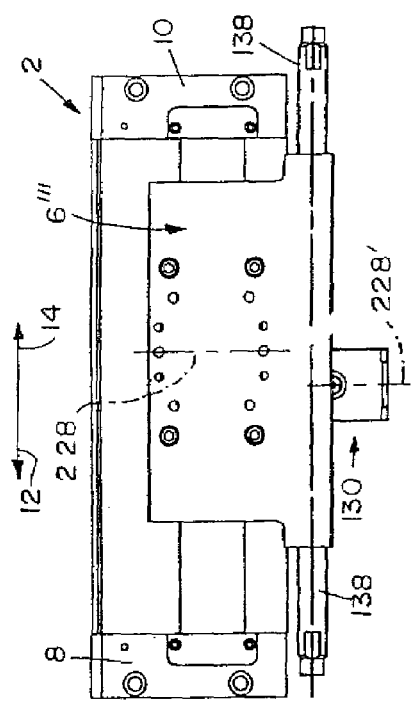
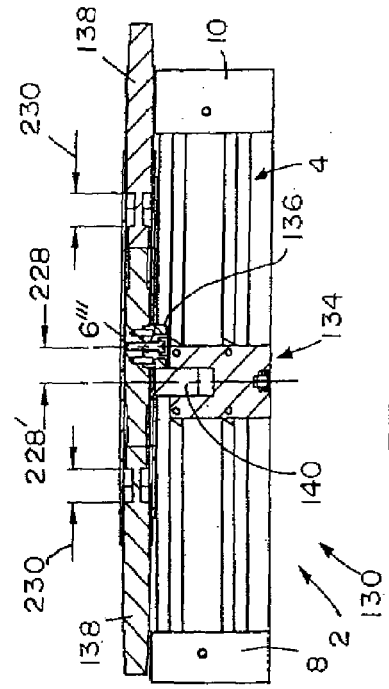

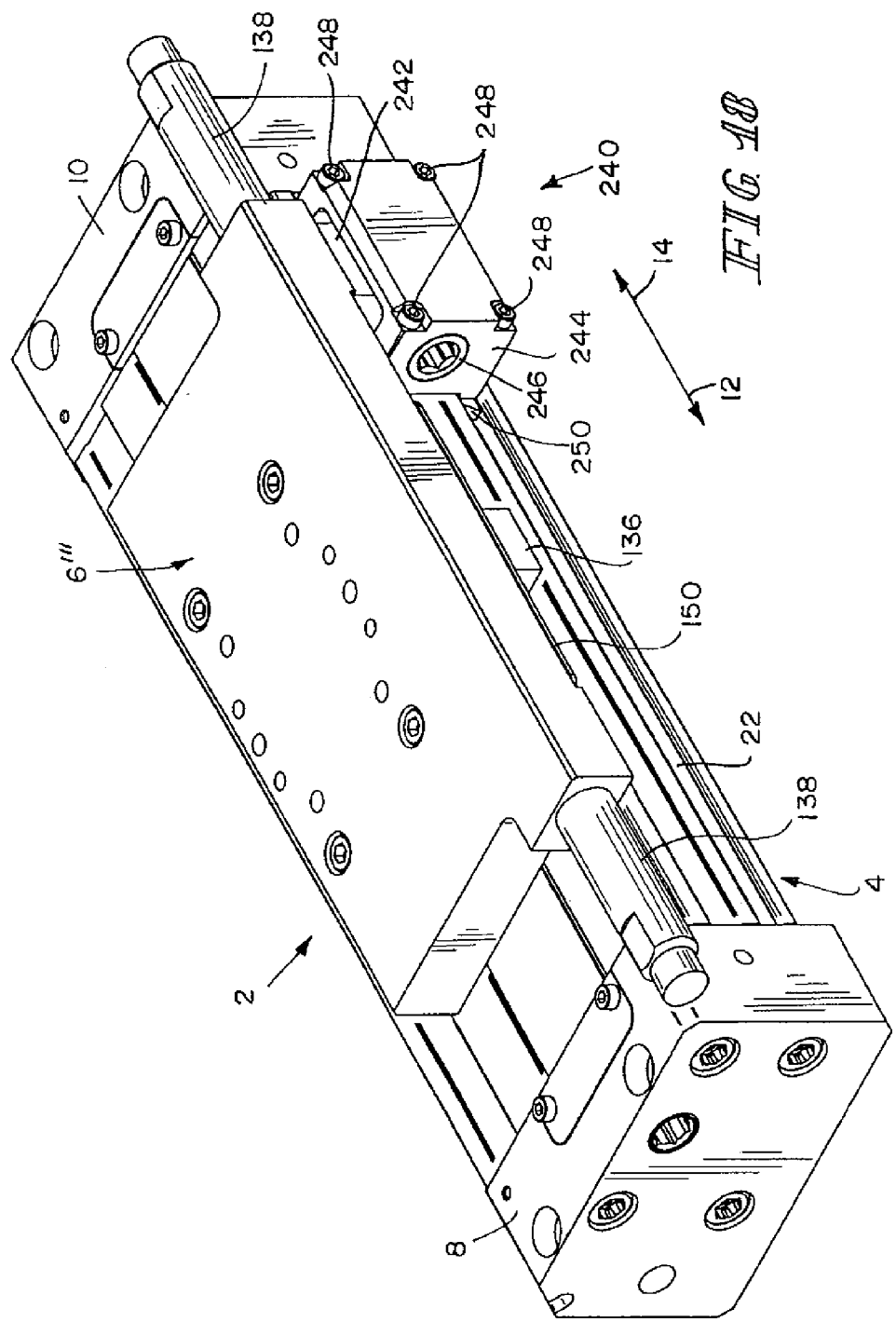

STOP FOR A SLIDE ASSEMBLY

RELATED APPLICATIONS

The present application is related to and claims priority to U.S. Provisional Patent Application Ser. No. 60/648,010, filed on Jan. 28, 2005, entitled "Stop for a Slide Assembly." The subject matter disclosed in that provisional application is hereby expressly incorporated into the present application.

TECHNICAL FIELD

The present disclosure relates to accessories for rodless slide assemblies and, more particularly, to rodless slide assemblies having a stop mechanism or mechanisms attached thereto.

BACKGROUND AND SUMMARY

Rodless slide assemblies are common devices that move a tool or workpiece mounting from one position to another. Typically, such rodless slide assemblies are used on manufacturing lines to assist in the manufacture of a product. A common rodless slide assembly includes an elongated cylinder body having an axially-extending chamber or slot disposed therein and a piston assembly located within the slot. The piston assembly moves reciprocally within the slot under fluid pressure. Such an assembly is considered "rodless" because rather than including a piston rod attached to a piston, it is attached to a motion-transmitting element which extends through the slot. This element is coupled to a carriage or saddle located exterior of the cylinder and moves concurrently therewith. The carriage is typically configured to receive a workpiece support tool, machine tool, etc. for use on the manufacturing line.

The axially-extending slot is typically sealed by means of a sealing strip or band located over the opening of the slot. The band is pressed against the periphery of the axially-extending slot often by either fastening or by internal fluid pressures. Generally, the sealing strip or band is pulled away from the axially-extending slot at about the center of the piston assembly whereabout the motion-transmitting element extends through the slot.

The cylinder that houses the piston, as well as provides the pathway along which the piston travels, can be made to any variety of lengths to accommodate a desired distance of travel. Typically, the piston and/or carriage moves the entire length of the cylinder. Typically the cylinder is capped at each end which receives the piston and/or carriage at the end of its stroke. It would be beneficial, however, to provide a rodless slide assembly having a carriage that can be stopped at an intermediate position, short of the end of the stroke typically defined by the length of the cylinder. The carriage may be stopped at one or a plurality of intermediate locations along the length of the stroke.

Accordingly, an illustrative embodiment of the present disclosure provides a rodless slide assembly that comprises a longitudinally-extending cylinder, a carriage, a stop assembly, and a catch assembly. The longitudinally-extending cylinder comprises first and second ends and a path of travel extending therebetween. The carriage is slidable on the path of travel on the cylinder between the first and second ends. The stop assembly comprises a stop block and is coupled to the carriage. The catch assembly comprises a catch bar and an actuator assembly. The catch bar is located adjacent the path of travel of the carriage. The actuator assembly selectively moves the catch bar to engage the stop block and stop the carriage when the carriage is positioned at a selected location on the path of travel. The catch bar further comprises a support portion that is spaced apart from the actuator assembly and does not impact the stop block, and is configured to absorb at least a portion of any impact force created during engagement between the catch bar and the stop block.

In the above and other illustrative embodiments, the rodless slide assembly may further comprise: the stop assembly being integrally formed with the carriage; the carriage further comprising an underside and the stop block being located on the underside; the carriage further comprising a side and the stop block being located on the side; the stop block being movable with respect to the carriage; the stop block being engagable with at least one shock absorber; the catch bar further comprising a fastener that attaches the catch bar to the actuator; the catch assembly comprising a catch block which comprises a cavity configured to receive the actuator assembly, a bore extending from the cavity that receives a portion of the catch bar such that when the actuator assembly extends the catch bar is extended to engage the stop block, and when the actuator assembly retracts the catch bar is retracted to not engage the stop block, and the catch block further comprises a second cavity that receives the support portion of the catch bar which is spaced apart from the cavity; the catch bar further comprising an impact portion which engages the stop block to absorb at least a portion of the impact force; the bore in the catch block comprising a first slot and the second cavity comprises a second slot being in communication with, and extending non-parallel to the first slot, and wherein the support portion being longitudinally-extending within the first slot and the impact portion being longitudinally-extending within the second slot; the catch bar being L-shaped; the catch bar being coupled to the actuator assembly via a fastener; spacing existing between the fastener and the catch bar to permit movement between the catch bar and the actuator assembly; the fastener being a shoulder bolt; the catch bar being engagable with a catch block at at least two locations on the catch block adjacent a location of impact on the stop block; the catch bar being engagable with the catch block both, below the location of impact on the stop block, and spaced apart from the actuator assembly; and an adjustable static catch assembly located adjacent the path of travel of the cylinder, the static catch assembly comprising: a static catch bar, at least a portion of which is located in a static catch block, and wherein the static catch bar remains extended to engage the stop block, and at least one adjustment fastener that is engagable with the static catch bar to move it independent of the catch block.

Another illustrative embodiment of a rodless slide assembly comprises a longitudinally-extending cylinder, a carriage, a stop assembly, and a static catch assembly. The longitudinally-extending cylinder comprises first and second ends and a path of travel extending therebetween. The carriage is slidable on the path of travel on the cylinder between the first and second ends. The stop assembly comprises a stop block and is coupled to the carriage. The static catch assembly comprises a static catch bar located adjacent the path of travel of the carriage, a catch block that receives at least a portion of the catch bar, wherein the static catch bar remains extended to engage the stop block, and a first adjustment fastener that is engagable with the static catch bar to move it relative to the cylinder and independent of the catch block.

In the above and other illustrative embodiments, the rodless slide assembly may further comprise: a second adjustment fastener located opposite the first adjustment fastener with the catch bar located therebetween; the first and second adjustment assemblies being threaded and rotatable in the catch block to move the catch bar in the direction of the path of travel of the carriage.

Another illustrative embodiment of a rodless slide assembly comprises a rodless slide assembly that comprises a longitudinally-extending cylinder, a carriage, a catch bar assembly, and a stop assembly. The longitudinally-extending cylinder comprises first and second ends and a path of travel extending therebetween. The carriage is slidable on the path of travel on the cylinder between the first and second ends. The carriage has a centerline located substantially transverse to the path of travel. The catch bar assembly is located adjacent the path of travel of the carriage. The catch bar assembly has a centerline located substantially transverse to the path of travel of the carriage. The stop assembly is coupled to the carriage and comprises: a stop block; first and second shock absorber assemblies, each located on opposite sides of the stop block, wherein each shock absorber assembly comprises a movable rod to dampen any impact force created during contact between the catch bar and stop block. Each rod is movable along a first and second stroke, respectively. Upon contact between the catch bar and the stop block, the carriage is decelerated and comes to rest so that the centerlines of both the carriage and the catch bar assembly are substantially coincident to each other. The rod of the first shock absorber assembly is compressed along substantially its full stroke.

In the above and other illustrative embodiments, the rodless slide assembly may further comprise the stop block being movable relative to the carriage.

Additional features and advantages of the rodless slide assembly will become apparent to those skilled in the art upon consideration of the following detailed description of the illustrated embodiment exemplifying the best mode of carrying out the rodless assembly as presently perceived.

BRIEF DESCRIPTION OF DRAWINGS

The present disclosure will be described hereafter with reference to the attached drawings, which are given as non-limiting examples only in which:

FIGS. 17a-d are top-plan and front cross-sectional views of an illustrative carriage from a rodless slide assembly, as well as a portion of a stop assembly;

FIG. 18 is a perspective view of another illustrative rodless slide assembly showing an illustrative embodiment of a static stop assembly.

Figure 1:
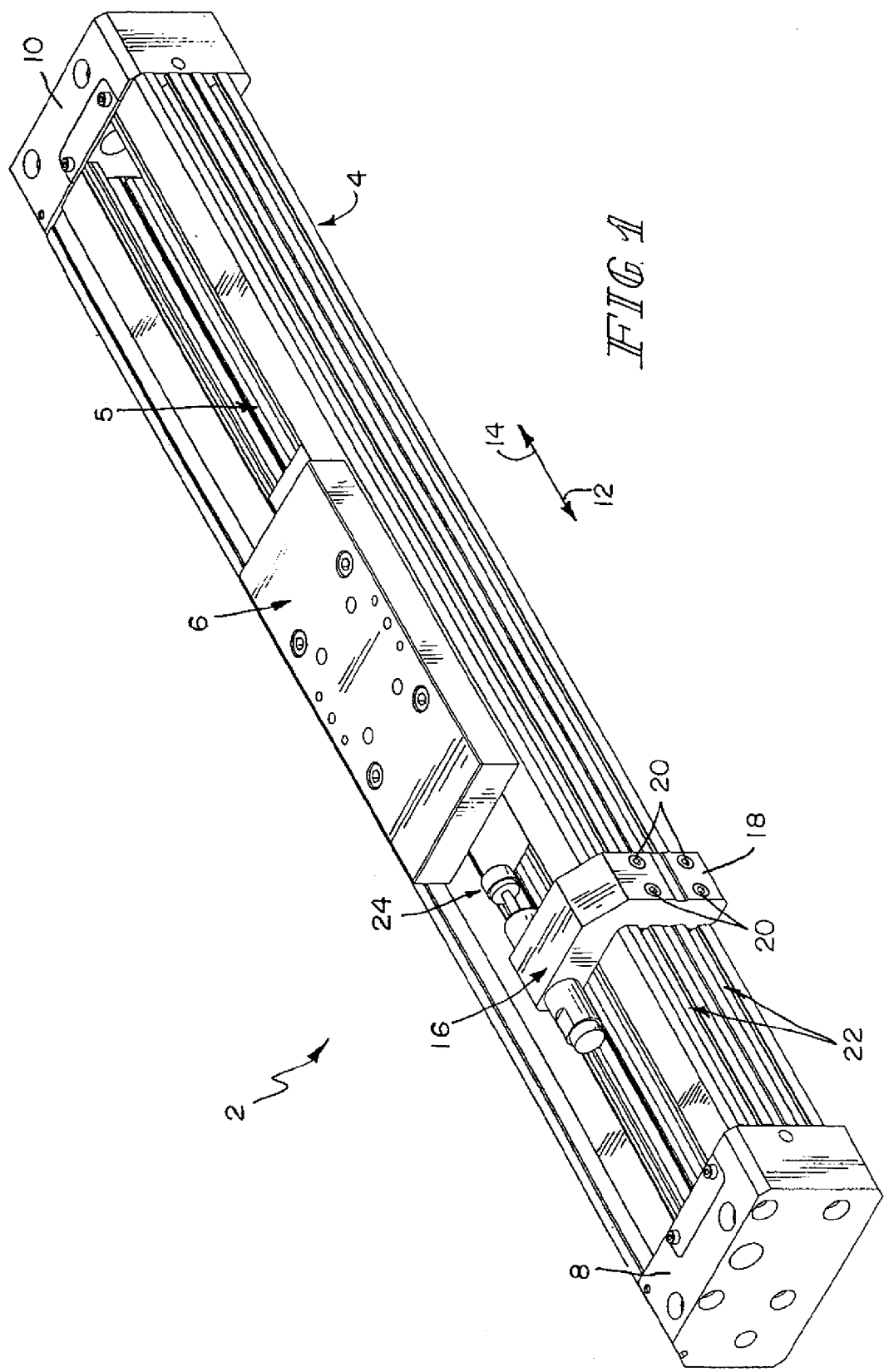
FIG. 1 is a perspective view of an illustrative rodless slide assembly including one illustrative embodiment of a stop assembly.

Corresponding reference characters indicate corresponding parts throughout the several views. The exemplification set out herein illustrates various embodiments of the rodless slide assembly, and such exemplification is not to be construed as limiting the scope of the rodless slide assembly in any manner.

DETAILED DESCRIPTION OF THE DRAWINGS

A perspective view of an illustrative rodless slide assembly 2 is shown in FIG. 1. The slide assembly comprises a cylinder 4 having a piston (not shown) located within slot 5. As known to those skilled in the art, the piston is typically coupled to a carriage 6 moving the same along the length of the cylinder. End caps 8 and 10 are located at the ends of cylinder 4 defining the stroke of carriage 6 which extends in directions 12 and 14. It is appreciated that the rodless slide assembly 2 shown herein is illustrative and it is contemplated that rodless slide assemblies of other configurations, including but not limited to dual chamber rodless slide assemblies, can be used for the purposes disclosed herein.

Figure 2:
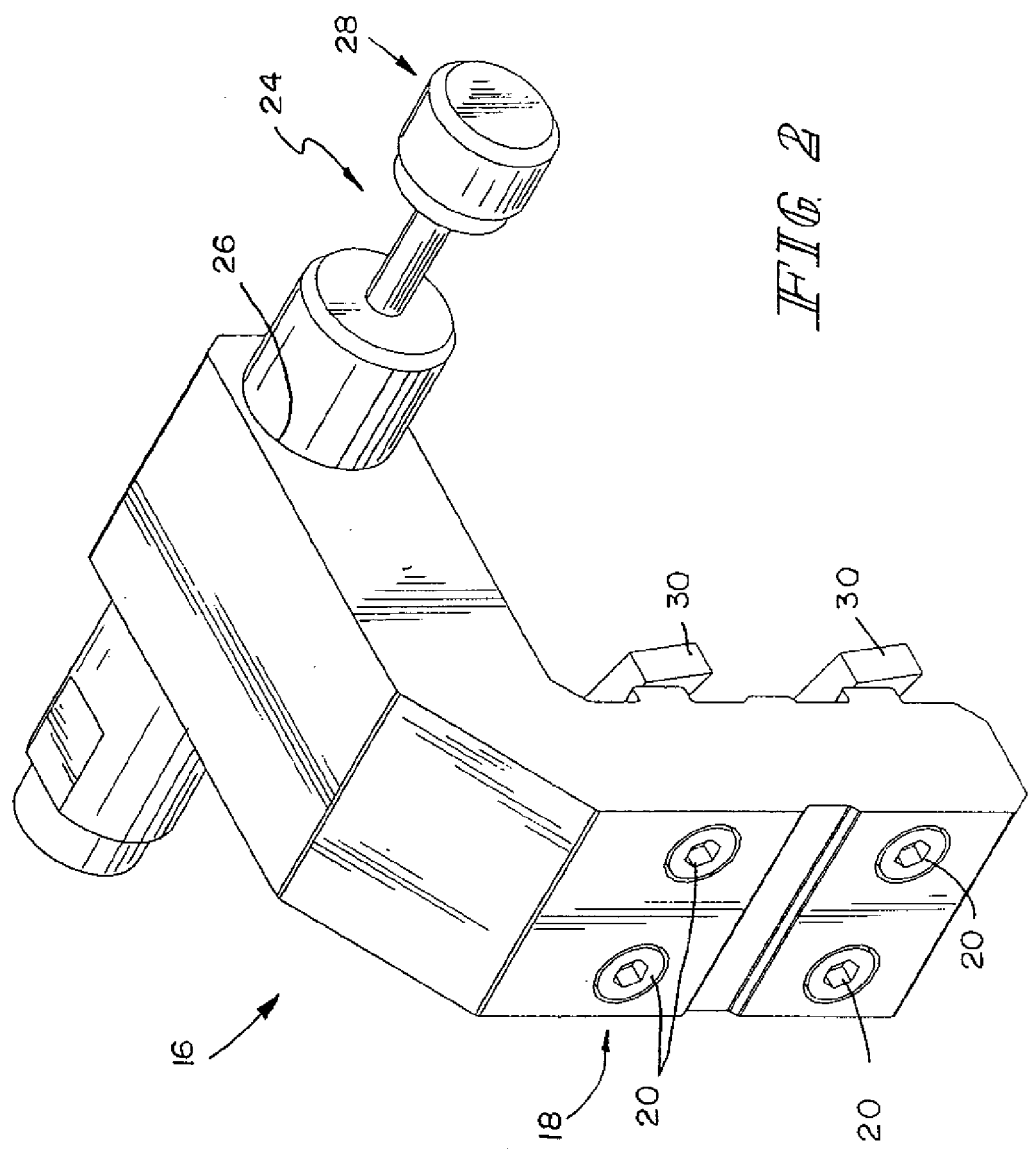
FIG. 2 is a perspective view of the stop assembly of FIG. 1.

A first embodiment of a stop assembly 16 is depicted in FIGS. 1 and 2. In the illustrated embodiment of FIG. 1, stop assembly 16 comprises a bracket 18 that is attachable to a portion of cylinder body 4 via fasteners 20. Illustratively, portions of bracket 18 can be disposed in slots 22 extending along the periphery of cylinder 4 to allow stop assembly 16 to be positioned anywhere along the length of the stroke. It is contemplated that stop assembly 16 can be adjustable so carriage 6 can engage shock absorbing assembly 24 and stop at any desired position along the stroke. It is further contemplated that multiple stop assemblies 16 can be positioned on rodless slide assembly 2 to limit movement of carriage 6.

The perspective view of stop assembly 16 is shown in FIG. 2. Bracket 18 is illustratively shaped to attach to the side of cylinder 4, as well as engage carriage 6. Bracket 18 can be illustratively fabricated from an aluminum extrusion having the appropriate geometry, or fabricated from aluminum stock, for example. Shock absorbing assembly 24 is illustratively an externally-threaded hydraulic shock absorber located within a threaded hole 26 passing through bracket 18. A shock pad 28 extends from assembly 24 and is configured to receive the impact from carriage 6. Bracket 18 is illustratively positioned near the location where carriage 6 is to be stopped. Bracket 18 is retained on the cylinder assembly via threaded fasteners 20 that engage T-nuts 30 which are received in slots 22. (See FIG. 1.) In one illustrative embodiment, precise adjustment of the stopping position for carriage 6 can be made by rotating shock absorbing assembly 24 back and forth within hole 26 (which is complimentarily threaded) to the desired position. It is further appreciated that in alternate embodiments other fastening attachments can be used on assembly 24 to selectively attach it to carriage 6.

Figure 3:
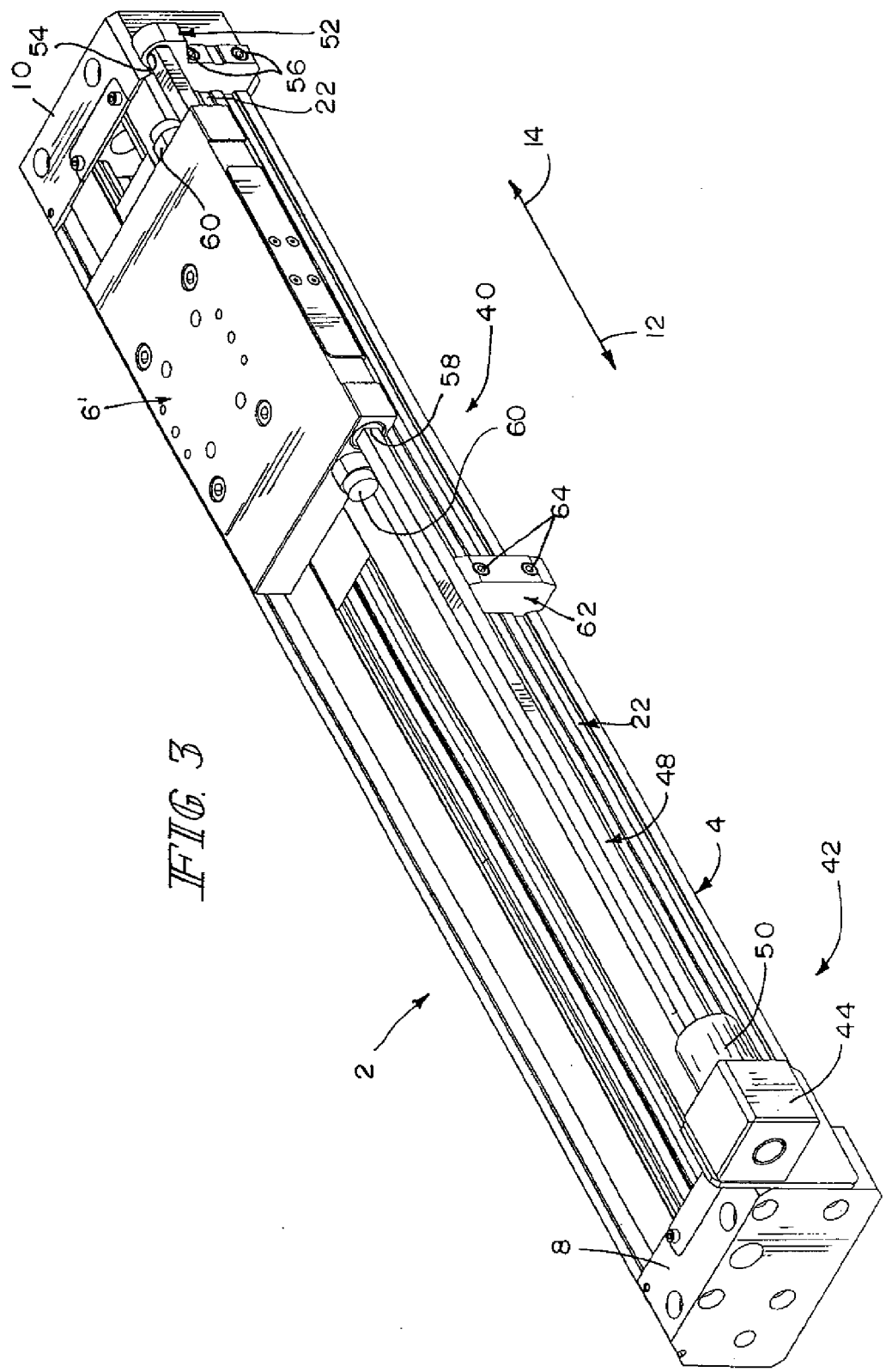
FIG. 3 is a perspective view of an illustrative rodless slide assembly including another illustrative embodiment of a stop assembly.
Figure 4:
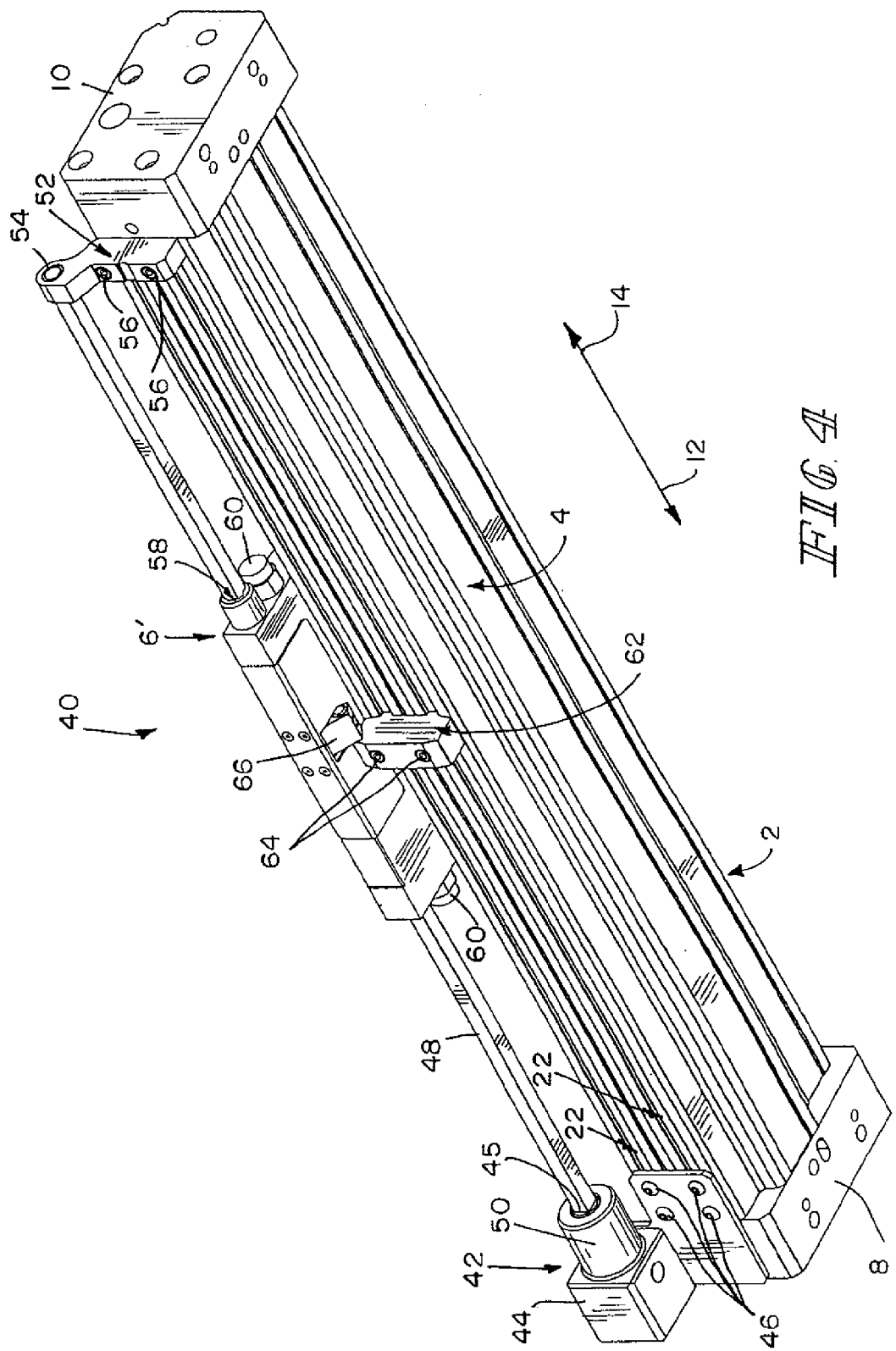
FIG. 4 is an underside-perspective view of the rodless slide assembly of FIG. 3, showing operation of the stop assembly.
Figure 5:
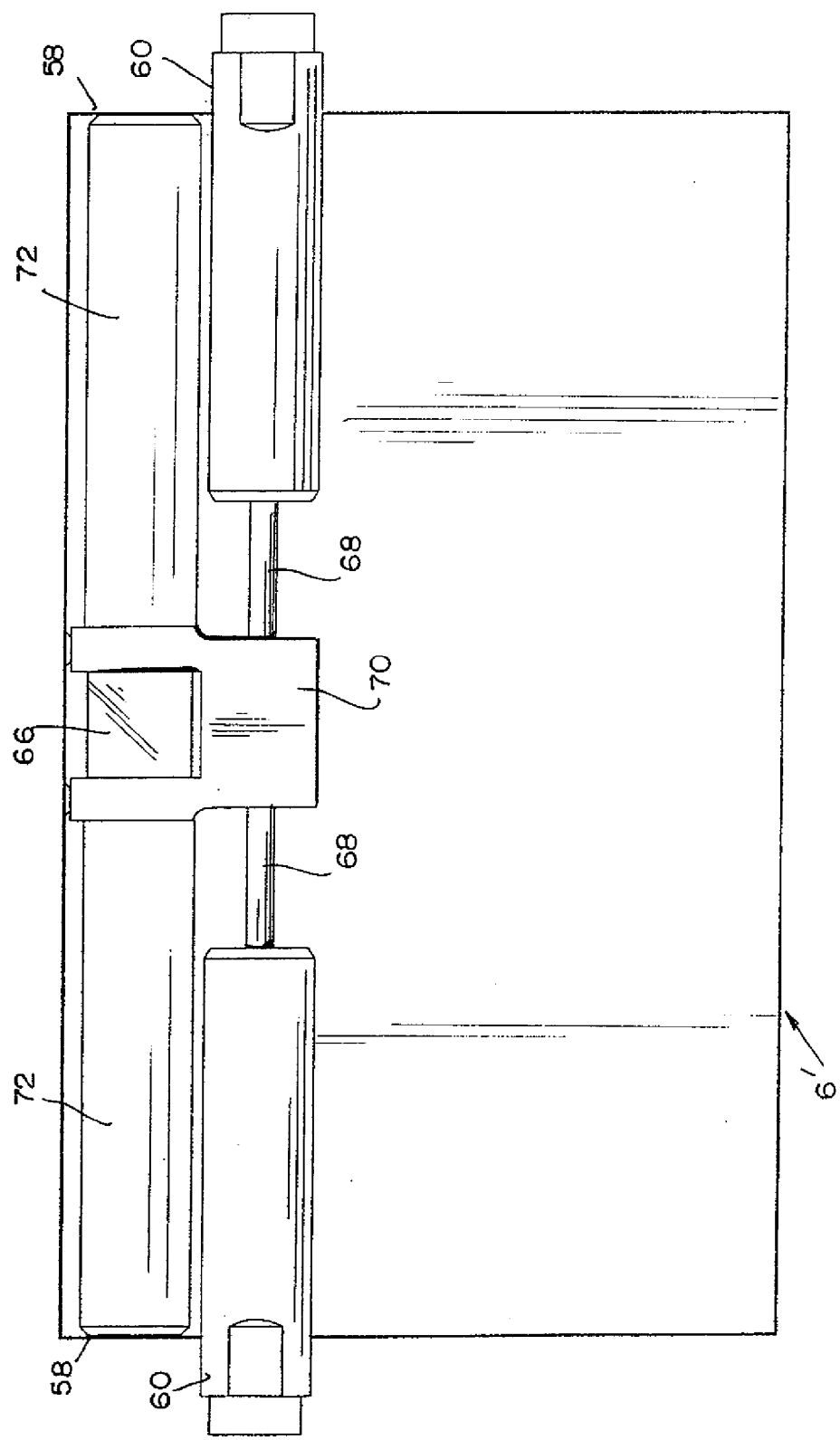
FIG. 5 is an underside view of the carriage portion of the rodless slide assembly of FIGS. 3 and 4 showing the internal structures of a portion of the stop assembly.
Figure 6:
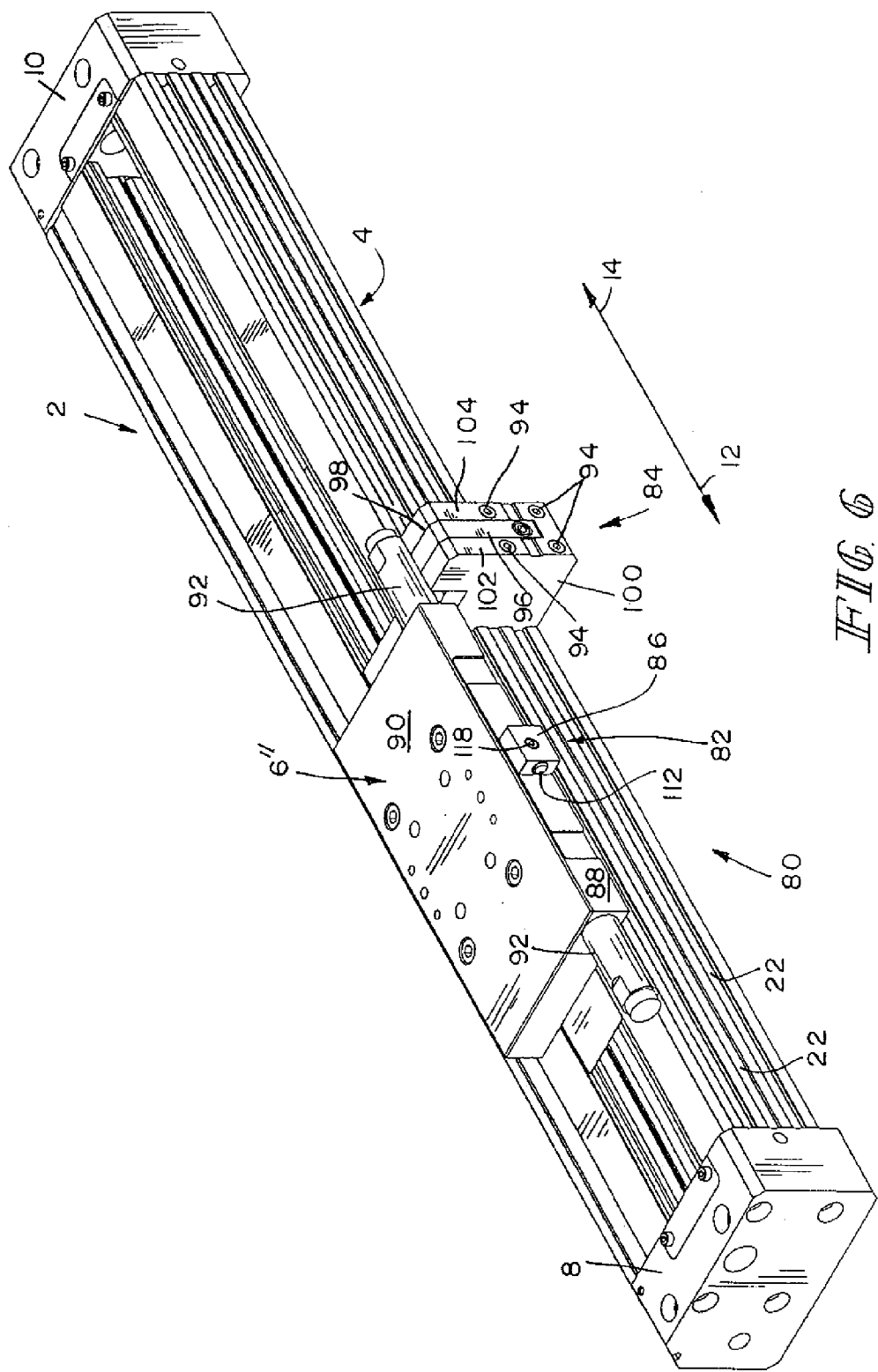
FIG. 6 is a perspective view of another illustrative rodless slide assembly including another illustrative embodiment of a stop assembly.

Another illustrative embodiment of a stop assembly 40 is shown in FIGS. 3-5. This embodiment allows selective control over whether the carriage will or will not stop at a predefined intermediate location or locations along the stroke of carriage 6'. A perspective view of illustrative rodless slide assembly 2 with stop assembly 40 coupled thereto is shown in FIG. 3. For illustrative purposes, slide assembly 2 is similar to slide assembly 2 shown in the previous embodiment, including cylinder 4 and caps 8 and 10. In addition, carriage 6' is movable in directions 12 and 14, similar to the prior embodiment. In this embodiment, however, an illustrative pneumatic rotary actuator assembly 42 is attached to assembly 2. Assembly 42 comprises an actuator 44 which can be a pneumatic rotary actuator or an electrically-driven rotary solenoid, for example, that can be positioned at a distal end of slide assembly 2. Actuator 44 can be retained on one side of cylinder 4 via fasteners 46 and T-nuts (not shown) that engage slots 22 similar to that described with respect to stop assembly 16 of the prior embodiment. (See, also, FIG. 4.) Illustratively, a bar 48 is disposed within a mating cavity 45 of rotating output shaft 50 of actuator 44 and extends about the length of travel of carriage 6'. (See FIG. 4.) In one embodiment, shaft 50 can be a fixed component of actuator 44. Additionally, it is appreciated that in one embodiment the rotation of bar 48 can take place internally to shaft 50. Bar 48 illustratively shown has a square cross-section. It is appreciated, however, that in other embodiments bar 48 may have other cross-sections suitable for the purposes further described herein. A bracket 52 is attached to slots 22 of body 4 opposite actuator 44. Bracket 52 has a bore 54 configured to receive the end of bar 48 opposite actuator 44. Bore 54 is illustratively configured to allow bar 48 to rotate unimpeded. As shown in FIG. 3, fasteners 56, in conjunction with T-nuts (not shown), engage slot 22 of cylinder 4 to lock bracket 52 into place.

In this embodiment, carriage 6' comprises a bore 58 disposed therethrough to receive bar 48. In addition, externally threaded shock absorbers 60 extend into carriage 6'. A stop block 62 attaches to slots 22 of cylinder 4 via fasteners 64. and T-nuts (not shown) in a manner similar to that described with respect to other embodiments.

The underside perspective view of slide assembly 2 in FIG. 4 depicts the operation of stop assembly 40. In this illustrative embodiment, saddle 6' is typically free to slide along the stroke of assembly 2 in directions 12 and 14 unencumbered. If it is desired that carriage 6' stop at an intermediate position along the stroke, particularly at stop block 62, a contact bar 66 is selectively activated to an engagable position to impact stop block 62 as shown. To accomplish this, actuator 44 is activated to rotate bar 48. That rotation causes at least a portion of contact bar 66 to extend from carriage 6' and strike stop block 62. It is appreciated that the rotation of bar 48 does not interfere with the linear movement of carriage 6' in directions 12 and 14. As shown in FIG. 4, carriage 6' was moved in direction 12 and contact bar 66 actuated to extend therefrom which stops carriage 6' at that location. When it is desired that carriage 6' continue moving in direction 12, actuator 44 again rotates bar 48, but now to retract bar 48 sufficient to remove contact bar 66 as an obstruction to stop block 62 allowing carriage 6' to pass. It is appreciated that bar 66 can be retracted fully into carriage 6' or retracted only enough to clear stop block 62. It is further appreciated that an alternate embodiment may include plurality of stop blocks attached to assembly 2 to facilitate a corresponding plurality of intermediate stopping positions for carriage 6'.

The underside view of carriage 6' shown in FIG. 5, further illustrates the mechanism that controls contact bar 66. As shown therein, two externally-threaded shock absorbers 60 with the input piston rods 68 opposing each other engage yoke 70. Bar 48 is illustratively disposed through yoke 70 and sliding members 72 and contact bar 66. Sliding members 72 may comprise a cross-sectional opening of square or other sufficient cross-sectional profile and dimension to receive bar 48. The outer surface of sliding members 72 may have a bearing surface that allows the same to rotate within bore 58 of carriage 6'. Actuation of actuator 44 causes bar 48, and thus, sliding member 72 to rotate along with contact bar 66.

Prior to contact with stop block 62, actuator 44 rotates bar 48 which rotates contact bar 66 into the impact position. Once contact bar 66 strikes stop block 62, a shock absorber assembly compresses to provide a controlled deceleration of contact bar 66, yoke 70, and sliding member 72. Continued movement of carriage 6' compresses the other shock absorber assembly 60 in a direction opposite the direction of travel by carriage 6' until the kinetic energy of carriage 6' and any attached loads are dissipated therethrough and carriage 6' is brought to rest. When contact bar 66 is then rotated away from stop block 62, by actuation of the actuator 44 and bar 48, carriage 6' is free to continue moving. It is appreciated that the dimension of the contact bar and stop block in the direction of travel of carriage 6' is illustratively chosen in conjunction with the stroke of the shock absorbers 60. This choice of dimension may provide the stop with the ability to position the centerline of the carriage 6' coincident with the centerline of the contact bar 66, regardless of which direction carriage 6' is traveling, as discussed further herein in conjunction with additional embodiments.

Another illustrative embodiment of a rodless slide assembly 2, incorporating another illustrative embodiment of a stop assembly 80, is shown in FIGS. 6-9. This illustrative embodiment comprises a stop block assembly 82 and a catch assembly 84. Stop block assembly 82 is located in carriage 6" and comprises a stop block 86 positioned outwardly from the side 88 of carriage 6". In the illustrated embodiment, side 88 is positioned essentially perpendicular to top surface 90 of carriage 6". Shock absorbers 92 are disposed in carriage 6" on each side of stop block 86.

Catch assembly 84 is configured to be positioned at a location about where carriage 6" is desired to be stopped. (See, also, FIG. 7.) Illustratively, assembly 84 is retained onto cylinder 4 via fasteners 94 and T-nuts (not shown) disposed in slots 22, similar to that described in previous embodiments. A catch bar 96 is disposed within a slot 98 of block 100. In this illustrative embodiment catch bar 96 is movable transverse to the directional movement of carriage 6". Block portions 102 and 104 prevent movement of catch bar 96 in directions 12 and 14. A pneumatically-driven piston or electrically-driven solenoid, or other suitable actuator used in conjunction with block 100, moves catch bar 96 towards stop block 86 preventing carriage 6" from moving there passed. The portions 102 and 104 buttress catch bar 96 by receiving and dissipating at least a portion of the impact force. It is appreciated that catch bar 96 can be retracted so that carriage 6" can move along the stroke of slide assembly 2 in directions 12 and 14 unencumbered by catch bar 96.

Figure 7:
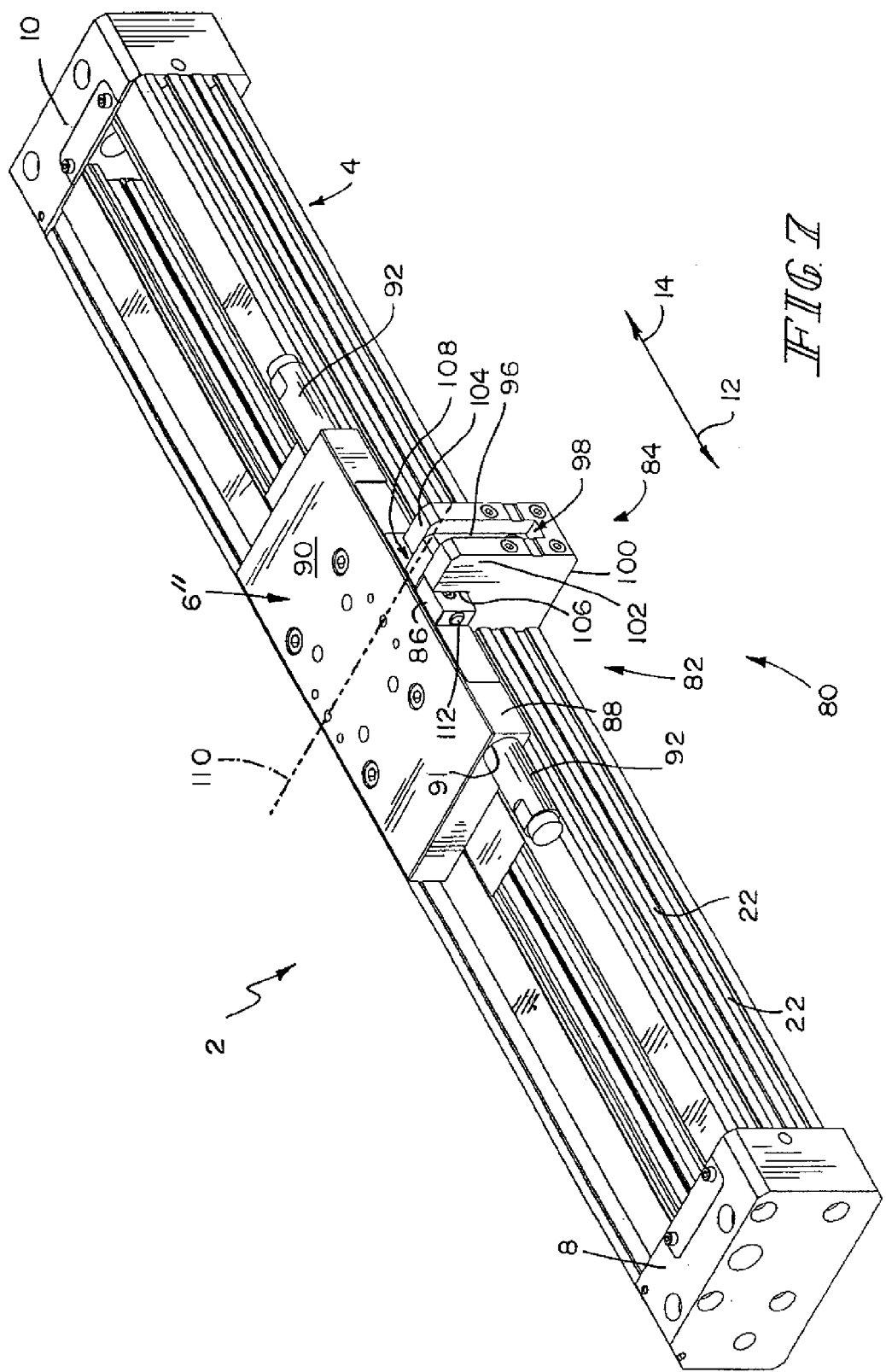
FIG. 7 is another perspective view of the rodless slide assembly of FIG. 6 showing operation of the stop assembly.

The perspective view of FIG. 7 depicts the impact between stop block 86 and catch bar 96 to stop carriage 6". Catch bar 96 is moved into an engaging position. Cutouts 106 and 108 formed in portions 102 and 104, respectively, provide clearance for stop block 86. In this illustrative embodiment, the positioning of stop block 86 along with the tension and stroke distances of shock absorber assemblies 92, assist in stopping carriage 6" along centerline 110 which is also the centerline of catch bar 96 as illustratively shown therein. Stop block 86 also illustratively comprises shock pads 112. Each pad 112 is located on a strike surface of stop block 86.

Figure 8:
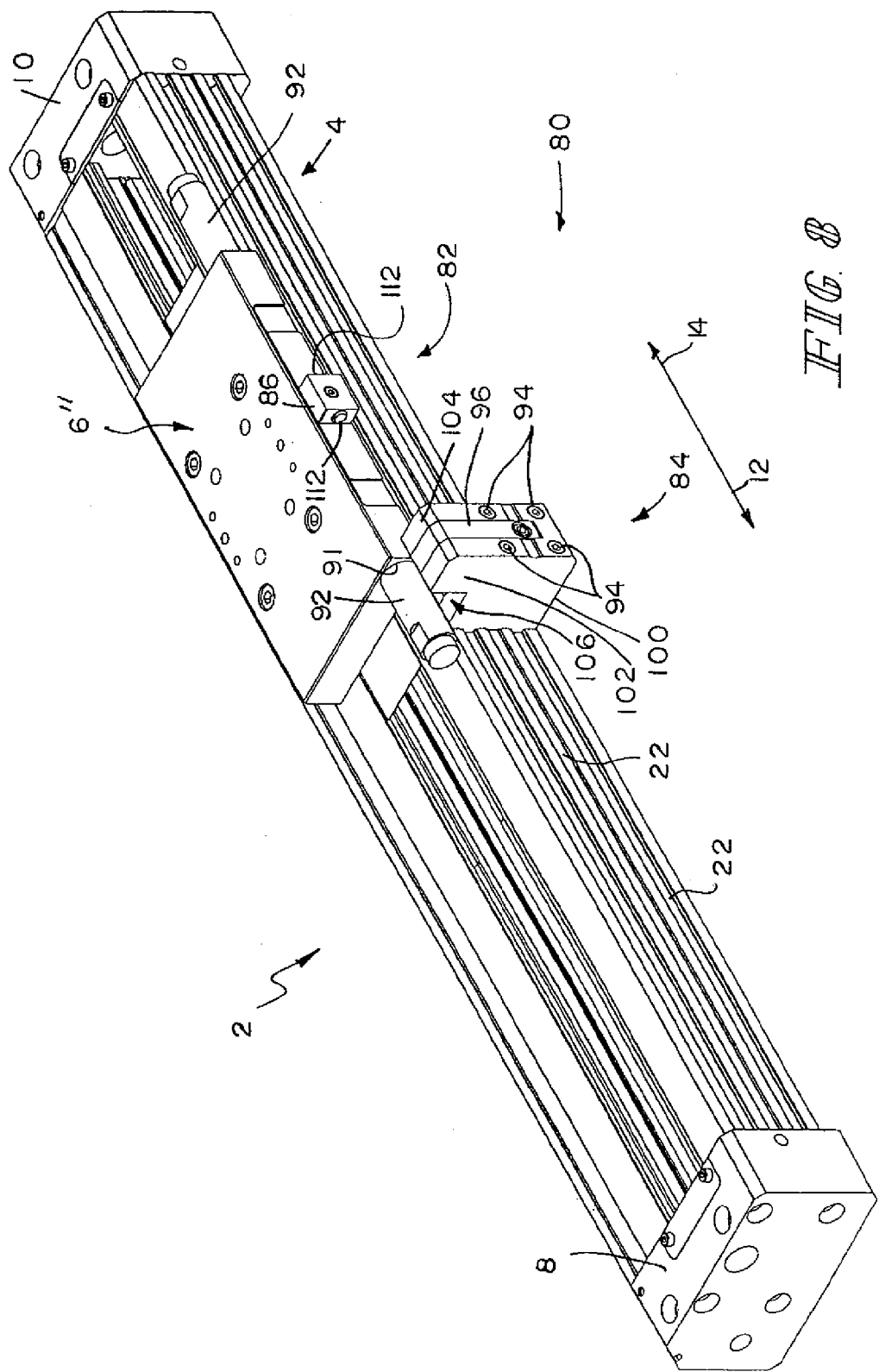
FIG. 8 is another perspective view of the slide assembly of FIGS. 6 and 7, showing the operation of the illustrative stop assembly.

Another view of slide assembly 2 is shown in FIG. 8. In this view, catch bar 96 has been retracted again, allowing carriage 6" to continue moving in direction 14. It is appreciated that the views in FIGS. 6-8 demonstrate a progression of motion of carriage 6" from a starting position and moving in direction 14 in FIG. 6, to catch bar 96 blocking stop block 86 to stop carriage 6" in FIG. 7, to releasing carriage 6" and continuing in direction 14 in FIG. 8 to complete the stroke. It is appreciated that this operation works in the same manner when carriage 6" is moving in the opposite direction 12. For instance, in this embodiment, stop block 86 will strike catch bar 96 again and portion 102 will serve to assist absorbing at least a portion of the impact force. In addition, it is contemplated that catch assembly 84 can be moved to any location along the length of cylinder 4. Also, a plurality of catch assemblies 84 can be fastened to cylinder 4 to stop carriage 6" at any plurality of intermediate locations.

Figure 9:
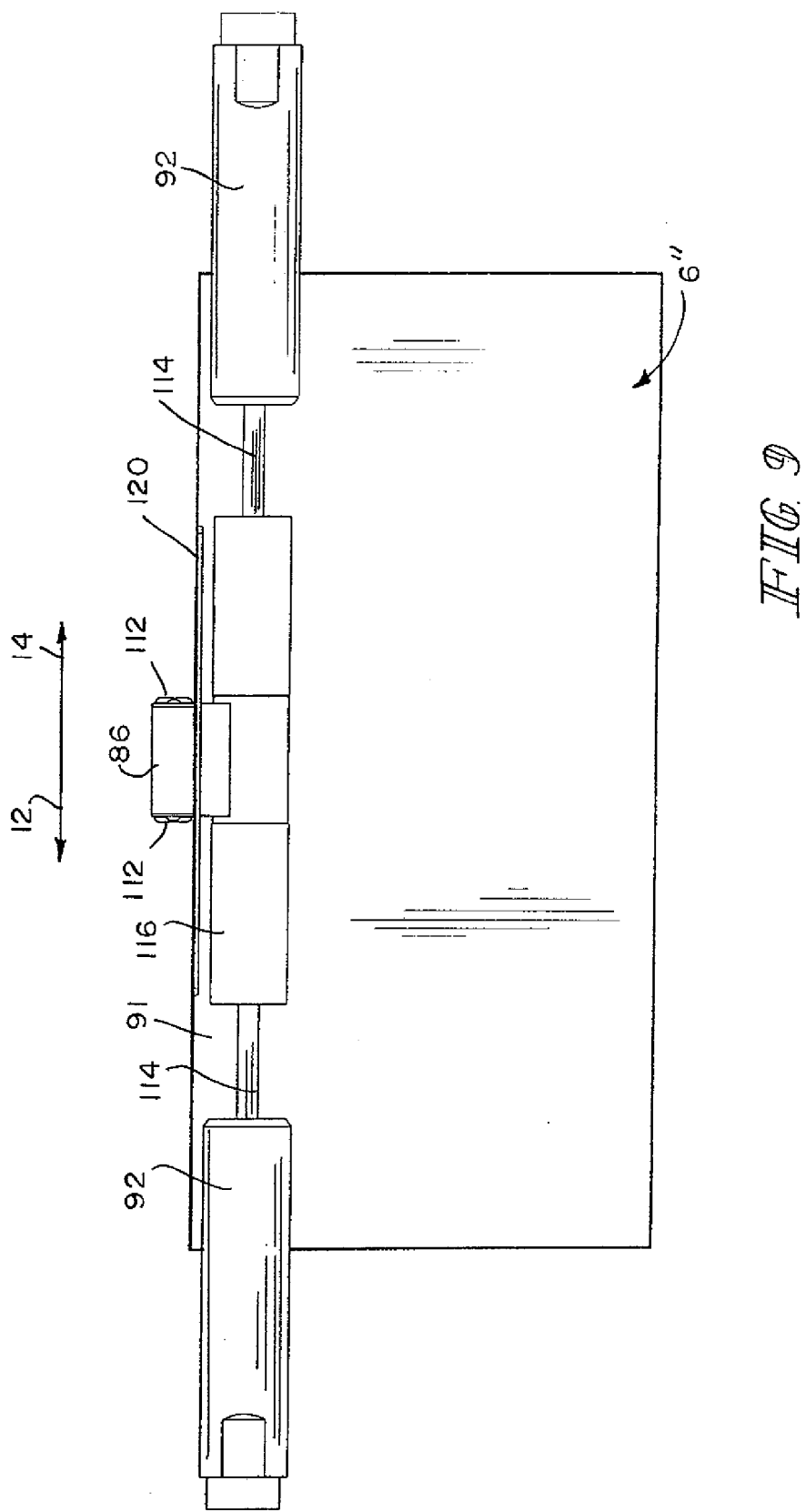
FIG. 9 is an underside view of the carriage of the rodless slide assembly of FIGS. 6-8 showing a portion of the stop assembly.

An underside view of carriage 6", including stop block assembly 82, is shown in FIG. 9. In this illustrative embodiment, shock absorber assemblies 92 include input piston rods 114 which engage a sliding member 116. A fastener 118 (see FIG. 6) attaches stop block 86 to sliding member 116. In the illustrative embodiment, shock absorbers 92 and sliding member 116 are positioned within a suitable bore 91 disposed in carriage 6". The shock absorbers 92 can be threaded or otherwise selectively attached within bore 91 so they can be adjusted with respect to sliding member 116. Sliding member 116 is movable within bore 91 of carriage 6" and transfers impact energy from stop block 86 into the shock absorbers 92 to dampen the impact force when striking catch assembly 84. (See, also, FIG. 7.) It is appreciated that the shock absorbers can be adjusted so not only will the centerline of carriage 6" mate with the centerline of catch bar 96, as shown in FIG. 7, but will also do so by moving rods 114 the full stroke of the shock absorbers, as discussed further herein. Also shown in this view is a cover plate 120 which covers any opening that exists in carriage 6" to accommodate movement of stop block 86 in directions 12 and 14.

Figure 10:
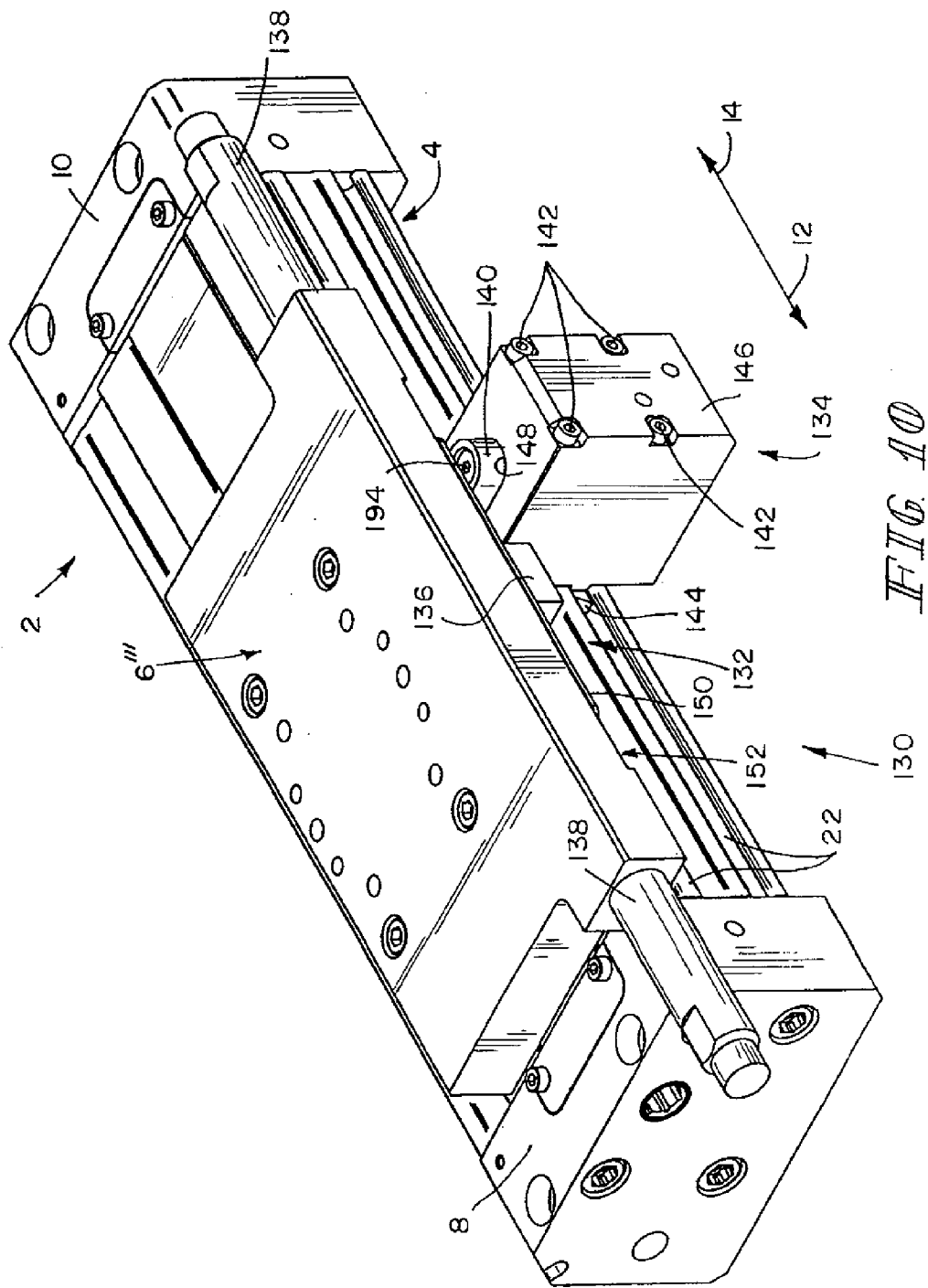
FIG. 10 is a perspective view of another illustrative rodless slide assembly including another illustrative embodiment of a stop assembly.

A perspective view of illustrative rodless slide assembly 2, with another illustrative embodiment of a stop assembly 130 comprising a stop block assembly 132 and catch assembly 134, is shown in FIG. 10. In one embodiment stop block assembly 132 is integrally formed with carriage 6'" which is movable along the length of cylinder 4 in directions 12 and 14, similar to previous embodiments. It can be appreciated that forming stop block assembly 132 and carriage 6'" as a monolithic unit may save material and cost, since less material is used and fewer components are assembled. In addition, stop block 136 is located underneath carriage 6'" as opposed to the side as shown in the prior embodiment. Carriage 6'" extends beyond the edge of cylinder 4 so that stop block 136 is movable along a line oriented in directions 12 and 14 parallel to movement of the slide. Shock absorber assemblies 138 located on opposed sides of stop block 136 are configured to dampen the impact force created when stop block 136 engages catch bar 140 of catch assembly 134. Similar to other embodiments, assembly 134 is configured to attach to slots 22 on the side of cylinder 4 via fasteners 142 that engage T-nuts 144 disposed in slot 22, as illustratively shown herein. Catch bar 140 is extendable from block 146 to selectively engage stop block 136. In this embodiment, catch bar 140 is disposed in a cavity 148 that assists in distributing at least a portion of the impact force as further described herein.

Figure 11:
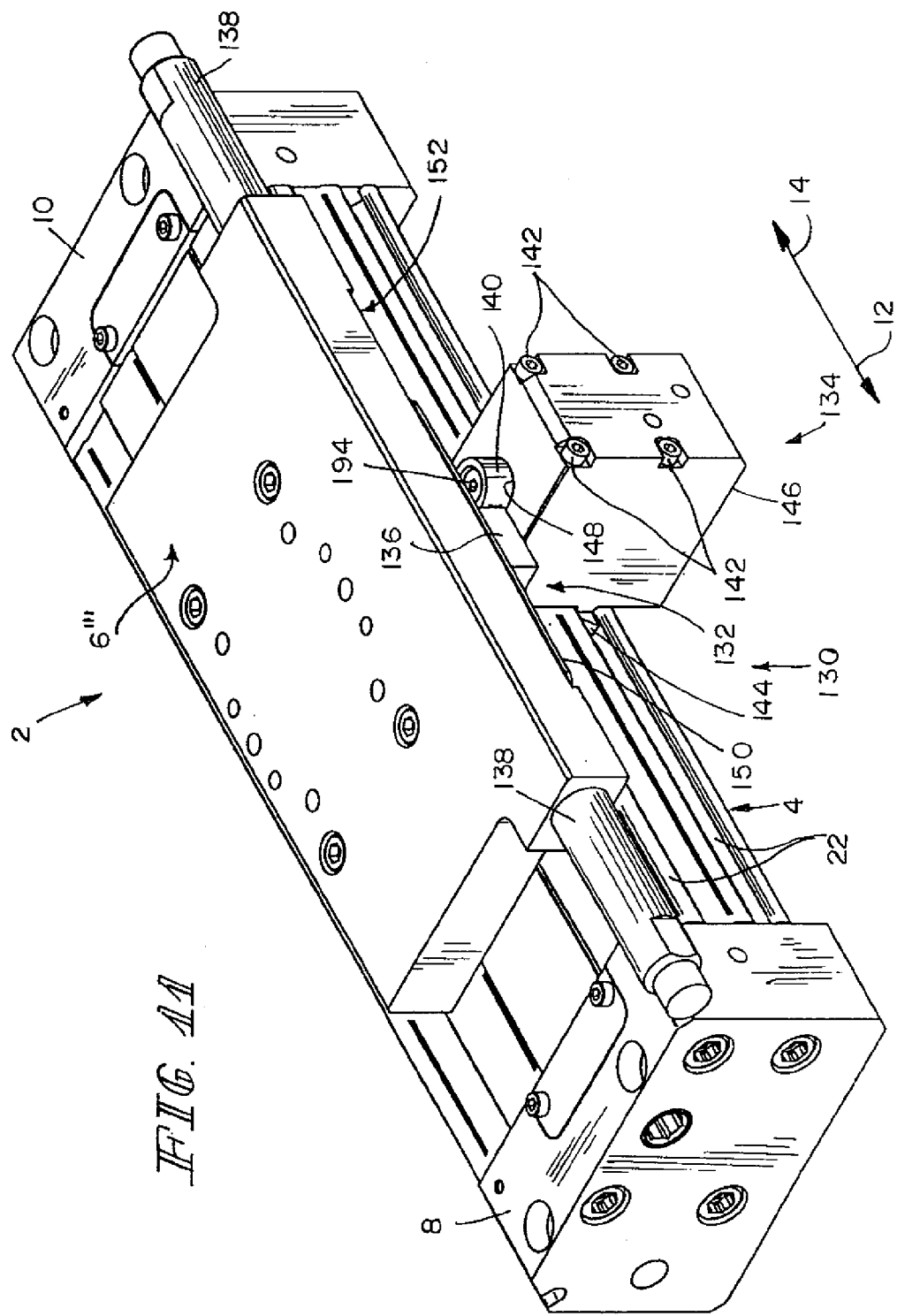
FIG. 11 is another perspective view of the rodless slide assembly of FIG. 10 showing the operation of the stop assembly.

The perspective view of rodless slide assembly 2 shown in FIG. 11 depicts carriage 6'" having moved further in direction 14 until stop 136 impacts catch bar 140. This stops carriage 6'". As shown, catch bar 140 is extended into the path of stop block 136 to initiate the contact. This view also shows the utility of the shock absorber assemblies 138 and cover plate 150. Not intending to be bound by any theory, it is believed that energy from the movement of carriage 6'", in the form Kinetic and possibly potential energy, dissipates during impact between block 136 and bar 140, Specifically, the impact between catch bar 140 and stop block 136 creates energy that needs to be dissipated. This is accomplished on the stop block assembly 132 side by shock absorber assemblies 138 decelerating carriage 6'" upon impact. In other words, in an illustrative embodiment, carriage 6'" still moves in direction 14 some distance once block 136 impacts bar 140 to allow energy to dissipate, as well as produce a relatively gentle stop of carriage 6'". Contrasting FIGS. 10 and 11, stop block assembly 132 is located generally within the center of recess 152 disposed in carriage 6'" in FIG. 10. In FIG. 11, assembly 132 moves in direction 12 relative to carriage 6'" to decelerate the same until it comes to rest. Cover plate 150 is illustratively elongated so that any opening on the underside of carriage 6'" is still covered during movement of carriage 6'" or upon its impact with catch assembly 134. It is appreciated that cover plate 150, similar to plate 120, has the utility of shielding any opening from exposure to contaminants or other material that might otherwise enter the interior of carriage 6'". (See slotted opening 162 in FIG. 13.)

Figure 12:
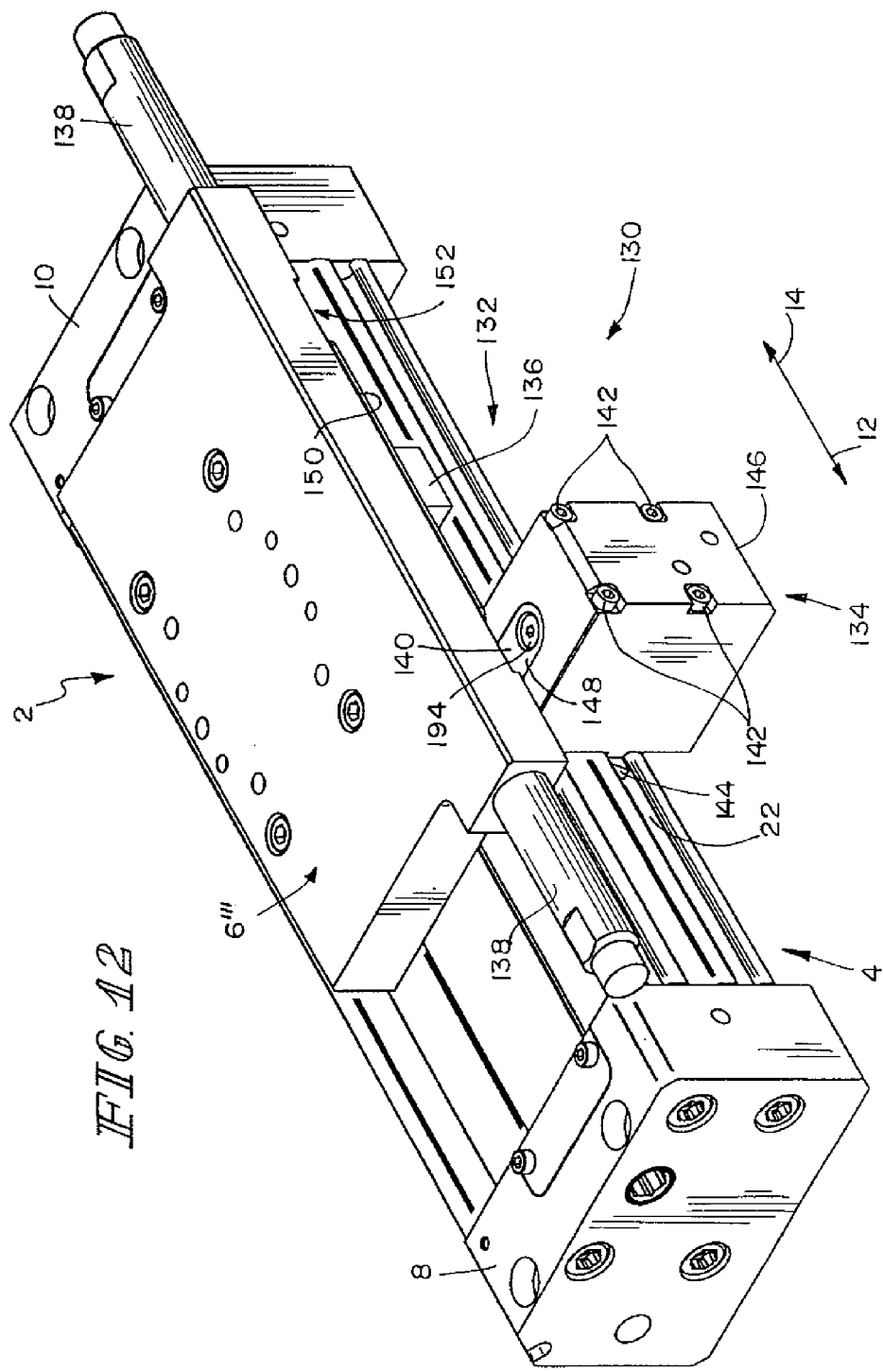
FIG. 12 is a perspective view of the rodless slide assembly of FIGS. 10 and 11, showing the continued operation of the stop assembly.

The perspective view of rodless slide assembly 2 shown in FIG. 12 depicts carriage 6'" moving passed catch assembly 134. Essentially, the views of FIGS. 10-12 demonstrate the movement of carriage 6'" along cylinder 4 to complete a stroke. It is appreciated that although the figures show carriage 6'" moving in direction 14, everything described herein is applicable to carriage 6'" moving in the opposite direction 12. Referring specifically to FIG. 12, catch bar 140 is recessed in cavity 148 of block 146. This clears catch bar 140 as an obstruction from stop block 136 allowing carriage 6'" to continue moving in direction 14. Illustratively, and similar to other embodiments, it is contemplated that as fluid is being applied to move carriage 6'" in direction 14, a force is being applied even as carriage 6'" is being stopped by catch assembly 134. (See FIG. 11.) This force holds carriage 6'" in place until catch bar 140 no longer becomes an obstruction. The fluid pressure can then continue moving carriage 6''' in direction 14. Also shown is stop block 136 returning to its original position within recess 152.

Figure 13:
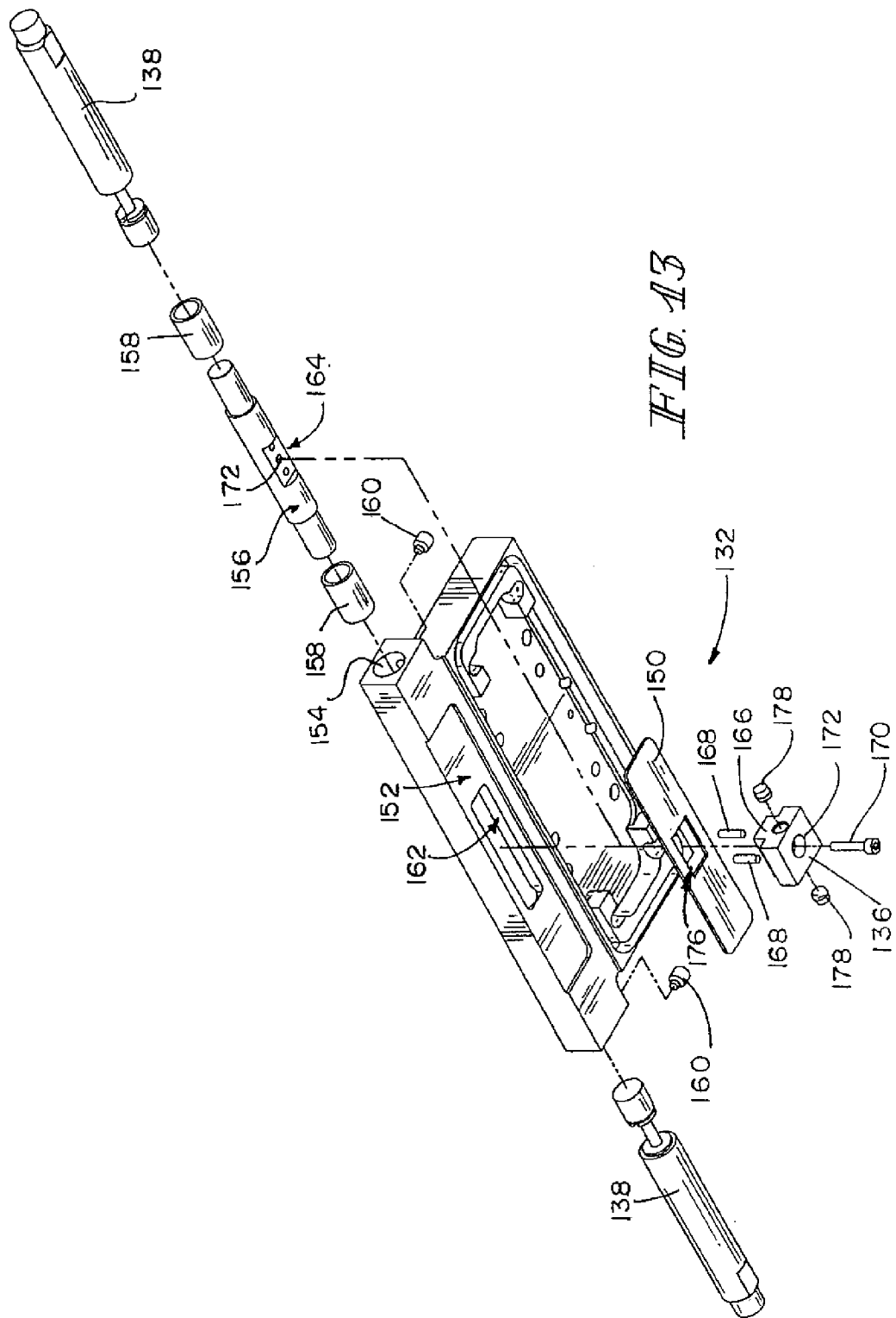
FIG. 13 is an underside exploded-perspective view of the carriage of the rodless slide assembly of FIGS. 10-12, as well as a portion of the stop assembly.

An upward looking exploded-perspective view of the underside of carriage 6''' is shown in FIG. 13. This view shows how stop block assembly 132 can be integrated into the monolithic body of carriage 6'''. As illustratively shown, carriage 6''' comprises a bore 154 within which sliding member 156 is movably positioned. Bushings 158 are illustratively located on each side of sliding member 156 and are either friction fitted or bonded to sliding member 156. Bushings 158 are illustratively made of a low friction polymer or other low friction material to facilitate sliding of sliding member 156 within bore 154. Illustratively, shock absorber assemblies 138 are each in contact with sliding member 156. Shock absorber assemblies 138 are configured to affect the movement of sliding member 156. Furthermore, set screws 160 are disposed in carriage 6''', as illustratively shown in FIG. 13, and are configured to secure shock absorber assemblies 138 to a desired position within bore 154. It is appreciated, however, that shock absorber assemblies 138 can be permanently or removably fixed to facilitate the desired movement and dampening of sliding member 156.

An illustratively slotted opening 162 is disposed in carriage 6''' allowing access external to carriage 6''' to bore 154. It is contemplated that groove 164 of sliding member 156 is located over slot 162 so that a tongue portion 166 of stop block 136 can be received therein. To facilitate proper mating between the structures, alignment pins 168 are illustratively disposed in both tongue portion 166 and groove 164. Fastener 170 is disposed through a bore 172 of stop block 136, as well as received in another threaded bore 172 of sliding member 156. Cover plate 150 comprises an opening 176 configured to receive the tongue portion 166 of stop block 136. In this illustrative embodiment, shock pads 178 can be coupled to the impact surfaces of stop block 136 to further assist in reducing the energy produced by the impact between stop block 136 and catch bar 140.

Figure 14:
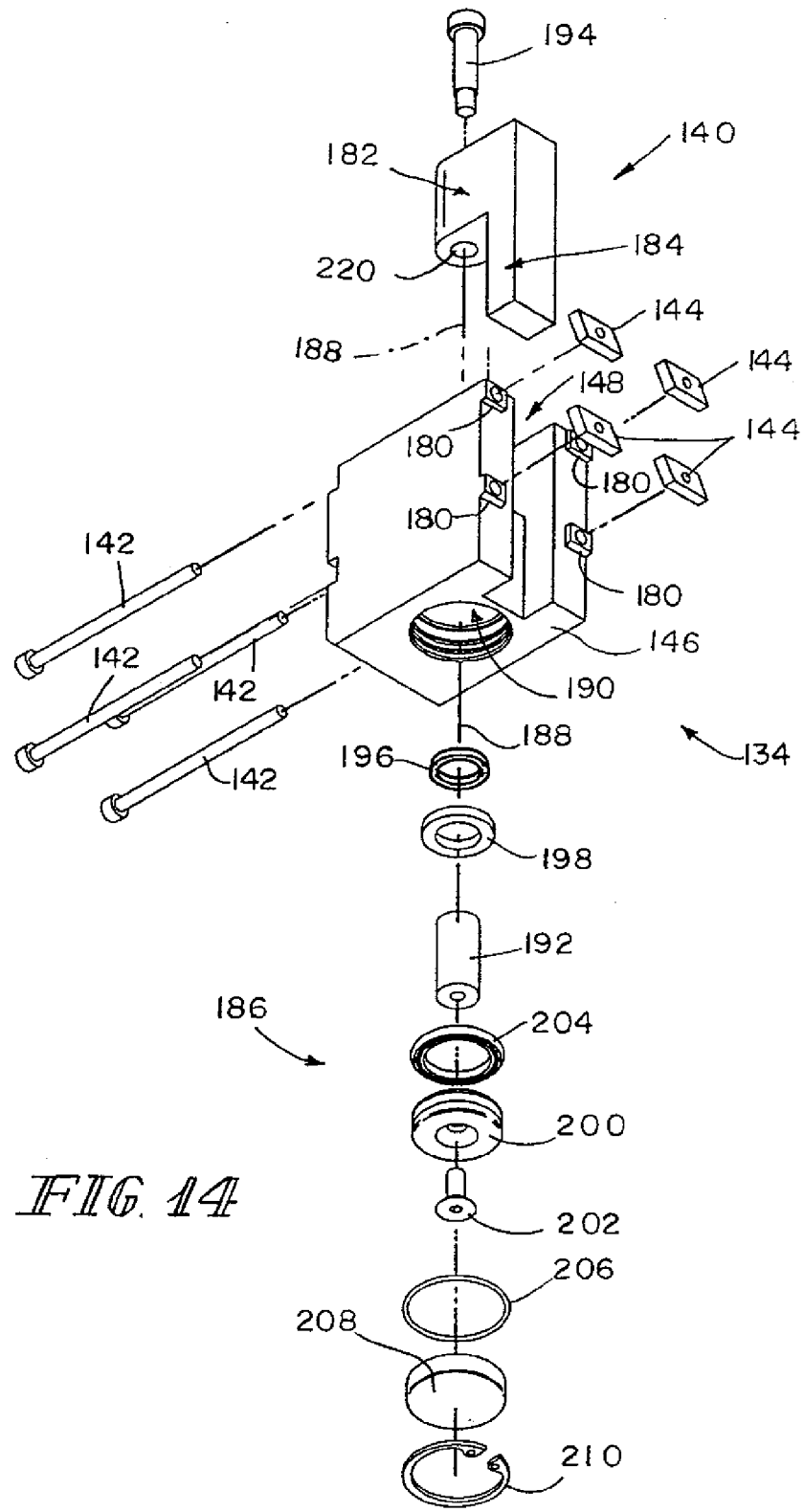
FIG. 14 is an underside exploded-perspective view of a catch assembly.

An exploded view of catch assembly 134 is shown in FIG. 14. Illustratively, block 146 is positioned where carriage 6''' is desired to be stopped. T-nuts 144 engage slots 22 and are secured thereon via fasteners 142. (See, also, FIGS. 10-12.) Ribs 180 illustratively engage a portion of slots 22 to align block 146 with the common access of slots 22 and to prevent rotation of block 146 with respect to slide 2. Catch bar 140 is disposed in cavity 148. In this embodiment catch bar 140 comprises an impact portion 182 and a support portion 184. Impact portion 182 is the part of catch bar 140 that impacts stop block 136. In contrast, support portion 184 does not directly impact stop block 136 but rather the sidewalls of slot 148, as discussed further herein. An illustrative pneumatically-driven piston assembly 186 is configured to move catch bar 140 along axis 188 shown therein. It is appreciated, however, that other actuators may be used, such as an electrically-driven solenoid assembly or the like.

Piston assembly 186 is configured to be located within piston bore 190. Piston assembly 186 comprises a piston rod 192 that attaches to catch bar 140 via fastener 194. Piston rod 192 is disposed through rod seal 196 which is retained in a mating bore (not shown) within block 146 and held by press fit seal retainer 198. Piston 200 is illustratively attached to piston rod 192 via fastener 202. A piston seal 204 is disposed about the periphery of piston 200 to form an air tight seal so that air pressure acting on either side of piston 200 can move the same. The open end of bore 190 is sealed via seal 206, plug 208 and retaining ring 210.

Figure 15:
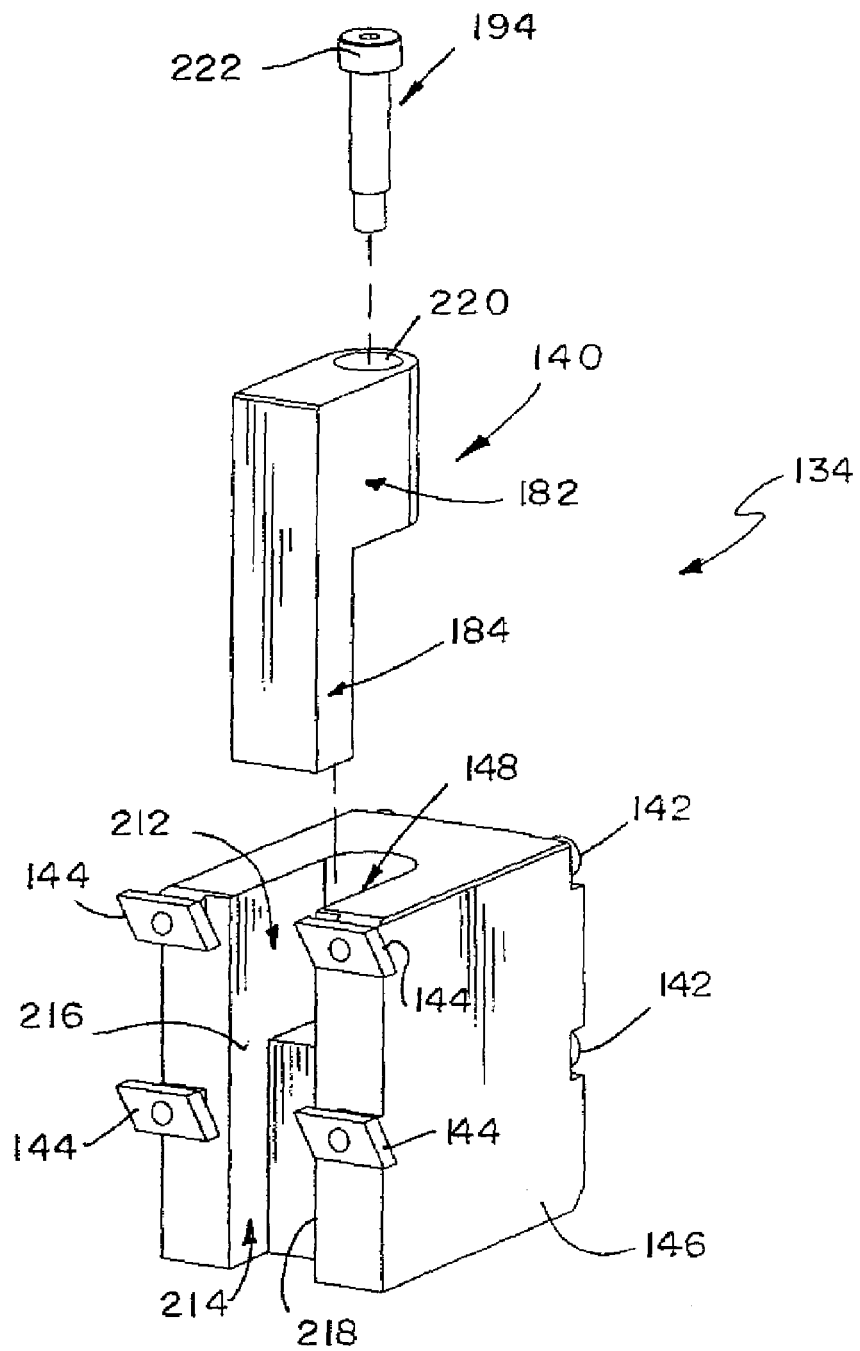
FIG. 15 is an exploded-perspective view of the catch assembly of FIG. 14.

A partially exploded-perspective view of catch assembly 134 is shown in FIG. 15. This view shows the relationship between catch bar 140 and cavity 148. As illustratively shown herein, impact portion 182 of catch bar 140 is positioned in a first support portion 212 within cavity 148. Support portion 184 of catch bar 140 is located in the second support portion 214 of cavity 148. It is appreciated that in an illustrative embodiment, catch bar 140 is open "L-shaped" to help dissipate the impact force or energy produced from the impact between stop block 136 and catch bar 140. It is believed that upon impact of the impact portion 182 of catch bar 140 with stop block 136, catch bar 140 engages the sidewalls 216 (or 218 depending on direction of travel of carriage 6'''). It is further believed that allowing this impact between the catch bar 140 and the sidewall of cavity 148 assists distributing that kinetic energy. This can be further useful so that energy is not transferred into piston assembly 186, which might otherwise result in a reduced operation life if constantly subjected to such impact forces. Furthermore, it is believed that the addition of support portion 184 of catch bar 140, being positioned in the second support portion of cavity 148, provides additional contact surface area where such energy can be dissipated. This is in contrast to simply a rod extending upward from the piston rod which upon impact is believed might transfer kinetic energy down into the piston assembly.

Figure 16:
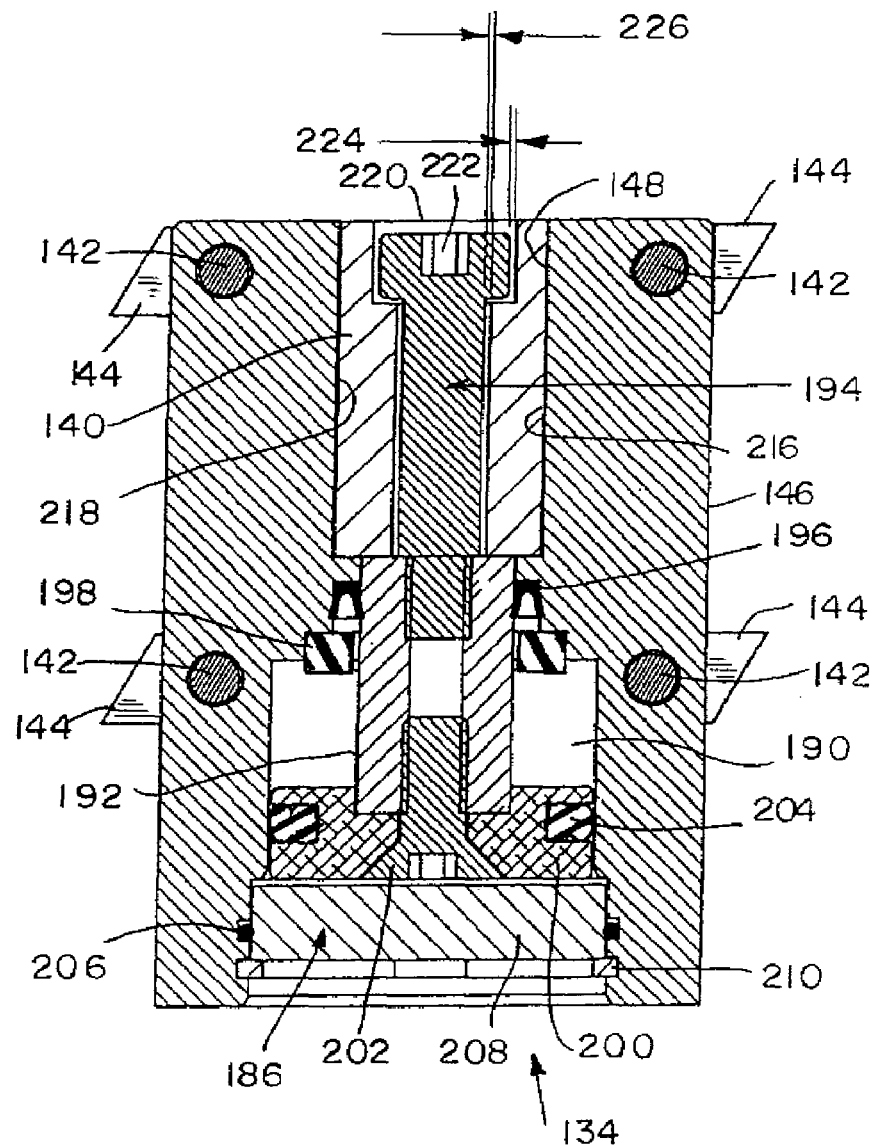
FIG. 16 is a cross-sectional elevational view of the catch assembly of FIGS. 14 and 15.

A cross-sectional elevational view of catch assembly 134 is shown in FIG. 16. This view again shows the force-absorbing characteristics of catch bar 140 and block 146. First, the contact between the walls 216 and 218 of cavity 148 abuts catch bar 140. In addition, in an illustrative embodiment piston assembly 186 is believed further protected while still attached to catch bar 140. Particularly, fastener 194 which may be a shoulder bolt configured to attach to piston rod 192 coupling the same and catch bar 140 together while allowing a radial clearance between fastener head 222 of fastener 194 and bore 220 of catch bar 140, as indicated by reference numeral 224. Similarly, a radial clearance 226 is provided between the shaft of fastener 194 and bore 220 of catch bar 140. This clearance or "play" means that the catch bar can move laterally with respect to the linear movement of piston assembly 186 along axis 188 while assembly 186 and catch bar 140 are coupled and, in the case of catch bar 140, be driven by assembly 186. This configuration allows catch bar 140 to possibly flex or bend slightly, or otherwise move upon impact with stop block 136 (see FIG. 11), while not transferring damaging energy into the piston assembly 186.

Top-plan and front-elevational cross-sectional views of rodless slide assembly 2 with stop assembly 130 attached thereto are shown in FIG. 17*a-d*. These views demonstrate how upon impact between stop block 136 and catch bar 140 the centerline 228 of carriage 6''' can be coincident with centerline 228' of catch bar 140 illustratively located in the center of assembly 134 while utilizing essentially equal strokes 230 on shock absorber assemblies 138. As shown in FIGS. 17*a* and *b*, carriage 6''' moves in direction 12 with stop block 136 impacting catch bar 140. At this position the centerlines 228 and 228' are offset. The strokes 230 of shock absorber assemblies 138 should be essentially equal distance. It is appreciated that in alternate embodiments, adjustment mechanisms, such as threaded shock members in stop block 136, for example, may be used to allow shock assemblies of different strokes to be used at each end. Because of the direction of travel of carriage 6''', sliding member 156, under urging of stop block 136, compresses one of the shock absorber assemblies 138. (See FIG. 17*d*.) In this case it is contemplated that the force applied to shock absorber assembly 138 will consume its entire available stroke 230. Because shock absorber assembly 138 is used to decelerate carriage 6''', the full compression is believed to allow a maximum, or at least optimum, amount of kinetic energy to be absorbed by the shock absorber assembly 138 which might have the effect of reducing the impact force that would be transferred into other structures, possibly extending useful life. Also, the net result is that centerline 228 and 228' are substantially coincident, which makes the stopping position of carriage 6''' possibly more predictable and/or reliable.

A perspective view of an illustrative rodless slide assembly 2 is shown in FIG. 18. This slide assembly 2 comprises an illustrative embodiment of a static stop assembly 240. Assembly 240 differs from previous stop or catch assemblies described herein in that the catch bar 242 does not retract or otherwise remove itself from the pathway of, in this case, stop block 136 on carriage 6'''. Stop assembly 240 can be useful for stopping carriage 6''' at the ends of a stroke. An illustrative embodiment of static stop assembly 240 comprises a block 244 which contains threaded adjustment screws 246. (See, also, FIG. 19.) It is contemplated that catch bar 242 can be adjustable by adjusting screws 246 allowing movement in directions 12 and 14 without having to remove and adjust the entire block 244. This can be useful because it may provide more precise stopping positions for saddle 6'''. In the illustrative embodiments shown, block 244 is attached to cylinder 4 via fasteners 248 which engage nuts 250 located within slots 22, as previously discussed with respect to other embodiments.

Figure 19:
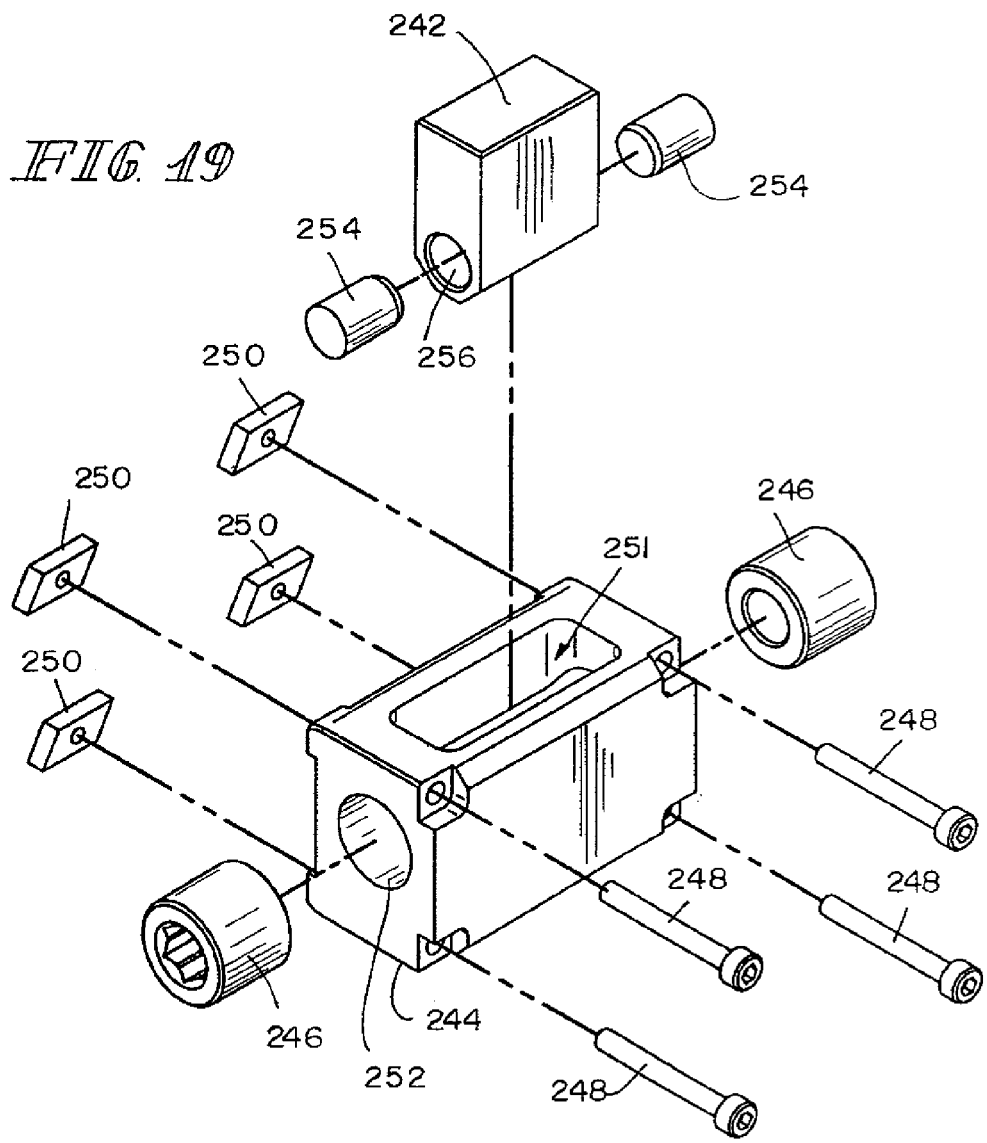
FIG. 19 is an exploded-perspective view of the static stop assembly of FIG. 18

An exploded view of static stop assembly 240 is shown in FIG. 19. This view shows catch bar 242 being disposed in cavity 251 which is in communication with bores 252. Adjustment screws 246 are illustratively positioned on each side of catch bar 242 and are disposed through bore 252 and into cavity 251. Alignment pins 254 are also illustratively positioned on each side of catch bar 242 and illustratively have a portion disposed in a bore 256. The adjustment screws 246 act on catch bar 242 to move catch bar 242 within cavity 251 having the affect of either extending or reducing the stroke of carriage 6'''.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A rodless slide assembly comprising;
a longitudinally-extending cylinder comprising first and second ends and a path of travel extending therebetween;
a carriage slidable on the path of travel on the cylinder between the first and second ends;
a stop assembly comprising a stop block;
wherein the stop assembly is coupled to the carriage; and
a catch assembly comprising a catch bar and an actuator assembly;
wherein the catch bar is located adjacent the path of travel of the carriage;
wherein the actuator assembly selectively moves the catch bar to engage the stop block and stop the carriage when the carriage is positioned at a selected location on the path of travel; and
wherein the catch bar further comprises a support portion that is spaced apart from the actuator assembly and does not impact the stop block, and is configured to absorb at least a portion of any impact force created during engagement between the catch bar and the stop block.

2. The rodless slide assembly of claim 1, wherein the stop assembly is integrally formed with the carriage.

3. The rodless slide assembly of claim 1, wherein the carriage further comprises an underside and the stop block is located on the underside.

4. The rodless slide assembly of claim 1, wherein the carriage further comprises a side and the stop block is located on the side.

5. The rodless slide assembly of claim 1, wherein the stop block is movable with respect to the carriage.

6. The rodless slide assembly of claim 1, wherein the stop block is engagable with at least one shock absorber.

7. The rodless slide assembly of claim 1, wherein the catch bar further comprises a fastener that attaches the catch bar to the actuator.

8. The rodless slide assembly of claim 1, wherein the catch assembly comprises a catch block which comprises a cavity configured to receive the actuator assembly, a bore extending from the cavity that receives a portion of the catch bar such that when the actuator assembly extends the catch bar is extended to engage the stop block, and when the actuator assembly retracts the catch bar is retracted to not engage the stop block, and the catch block further comprises a second cavity that receives the support portion of the catch bar which is spaced apart from the cavity.

9. The rodless slide assembly of claim 8, wherein the catch bar further comprises an impact portion which engages the stop block to absorb at least a portion of the impact force.

10. The rodless slide assembly of claim 9, wherein the bore in the catch block comprises a first slot and the second cavity comprises a second slot that is in communication with, and extends non-parallel to the first slot, and wherein the support portion is longitudinally-extending within the first slot and the impact portion is longitudinally-extending within the second slot.

11. The rodless slide assembly of claim 10, wherein the catch bar is L-shaped.

12. The rodless slide assembly of claim 1, wherein the catch bar is coupled to the actuator assembly via a fastener.

13. The rodless slide assembly of claim 12, wherein spacing exists between the fastener and the catch bar to permit movement between the catch bar and the actuator assembly.

14. The rodless slide assembly of claim 13, wherein the fastener is a shoulder bolt.

15. The rodless slide assembly of claim 1, wherein the catch bar is engagable with a catch block at at least two locations on the catch block adjacent a location of impact on the stop block.

16. The rodless slide assembly of claim 15, wherein catch bar is engagable with the catch block, both below the location of impact on the stop block and spaced apart from the actuator assembly.

17. The rodless slide assembly of claim 16, further comprising an adjustable static catch assembly located adjacent the path of travel of the cylinder, the static catch assembly comprises: a static catch bar, at least a portion of which is located in a static catch block, and wherein the static catch bar remains extended to engage the stop block, and at least one adjustment fastener that is engagable with the static catch bar to move it independent of the catch block.

18. A rodless slide assembly comprising;
a longitudinally-extending cylinder comprising first and second ends and a path of travel extending therebetween;
a carriage slidable on the path of travel on the cylinder between the first and second ends;
a stop assembly comprising a stop block;
wherein the stop assembly is coupled to the carriage;
a static catch assembly which comprises:
a static catch bar located adjacent the path of travel of the carriage;
a catch block that receives at least a portion of the catch bar;
wherein the static catch bar remains extended to engage the stop block, and
a first adjustment fastener that is engagable with the static catch bar to move it relative to the cylinder and independent of the catch block.

19. The rodless slide assembly of claim 18, further comprising a second adjustment fastener located opposite the first adjustment fastener with the catch bar located therebetween.

20. The rodless slide assembly of claim 19, wherein the first and second adjustment assemblies are threaded and rotatable in the catch block to move the catch bar in the direction of the path of travel of the carriage.

21. A rodless slide assembly comprising;
a longitudinally-extending cylinder having first and second ends and a path of travel extending therebetween;
a carriage slidable on the path of travel on the cylinder between the first and second ends;
wherein the carriage has a centerline located substantially transverse to the path of travel;
a catch bar assembly located adjacent the path of travel of the carriage;
wherein the catch bar assembly has a centerline located substantially transverse to the path of travel of the carriage; and
a stop assembly coupled to the carriage;
wherein the stop assembly comprises:
a stop block;
first and second shock absorber assemblies, each located on opposite sides of the stop block, wherein each shock absorber assembly comprises a movable rod to dampen any impact force created during contact between the catch bar and stop block, and wherein each rod is movable along a first and second stroke, respectively;
wherein upon contact between the catch bar and the stop block the carriage is decelerated and comes to rest so that the centerlines of both the carriage and the catch bar assembly are substantially coincident to each other; and
wherein the rod of the first shock absorber assembly is compressed along substantially its full stroke.

22. The rodless slide assembly of claim 21, wherein the stop block is movable relative to the carriage.

* * * * *